United States Patent
Okada et al.

(10) Patent No.: US 7,289,765 B2
(45) Date of Patent: Oct. 30, 2007

(54) OFDM DEMODULATOR

(75) Inventors: Takahiro Okada, Saitama (JP); Tamotsu Ikeda, Tokyo (JP)

(73) Assignee: Sony Corporation (JP)

( * ) Notice: Subject to any disclaimer, the term of this patent is extended or adjusted under 35 U.S.C. 154(b) by 611 days.

(21) Appl. No.: 10/505,793

(22) PCT Filed: Dec. 18, 2003

(86) PCT No.: PCT/JP03/16262

§ 371 (c)(1),
(2), (4) Date: Aug. 25, 2004

(87) PCT Pub. No.: WO2004/062151

PCT Pub. Date: Jul. 22, 2004

(65) Prior Publication Data

US 2005/0163094 A1    Jul. 28, 2005

(30) Foreign Application Priority Data

Dec. 27, 2002    (JP) .............................. 2002-382214

(51) Int. Cl.
*H04Q 7/00* (2006.01)
(52) U.S. Cl. .................. 455/45; 370/204; 375/260
(58) Field of Classification Search ...................... None
See application file for complete search history.

(56) References Cited

U.S. PATENT DOCUMENTS

2004/0179633 A1*   9/2004   Shinoda et al. ............. 375/343

* cited by examiner

*Primary Examiner*—Nick Corsaro
*Assistant Examiner*—Joel Ajayi
(74) *Attorney, Agent, or Firm*—Lerner, David, Littenberg, Krumholz & Mentlik, LLP

(57) ABSTRACT

An OFDM demodulator includes an FFT circuit, a phase correction circuit, and a timing synchronization circuit. The timing synchronization circuit includes a symbol-boundary calculation circuit to estimate a symbol-boundary position Nx by filtering the correlation peak of a guard interval, symbol-boundary correction circuit to calculate a clock-phase error based on the symbol-boundary position Nx, and a start-flag generation circuit to generate a start flag for the FFT calculation. The symbol-boundary correction circuit subtracts only a value whose precision is smaller than the cycle of a reference clock from the symbol-boundary position Nx, and generates a phase correction signal for each sub-carrier based on the value. The phase correction circuit performs a complex multiplication of the FFF-calculated signal by the phase correction signal to correct the clock-phase error.

3 Claims, 15 Drawing Sheets

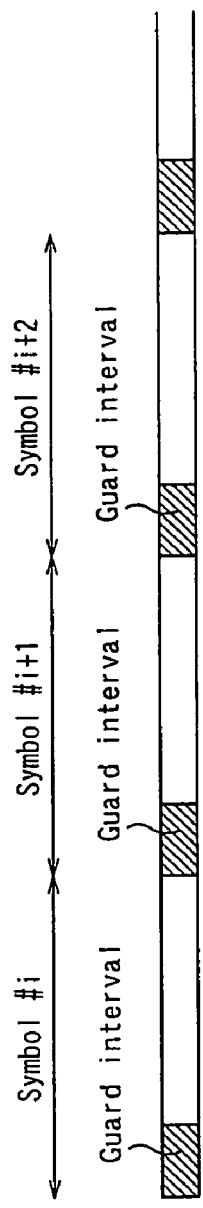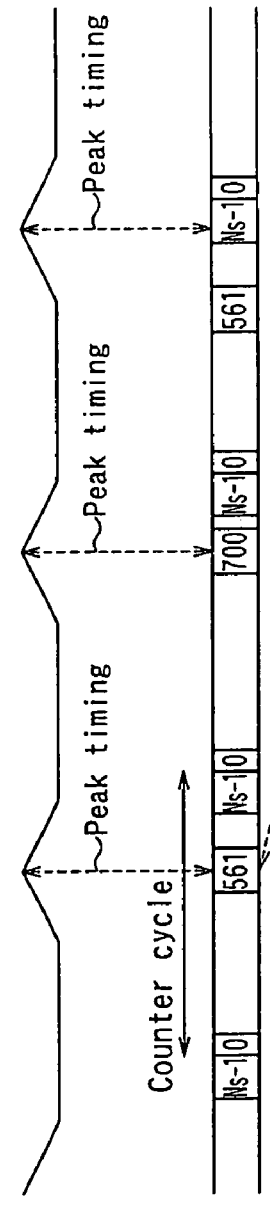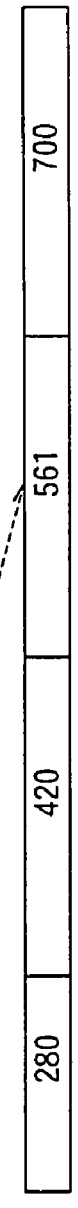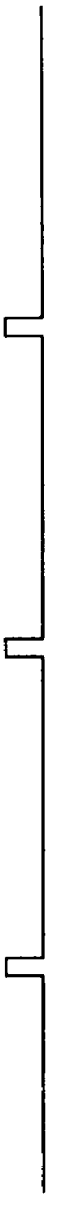
FIG.7A OFDM time-domain signal (without delay)
FIG.7B OFDM time-domain signal (delayed by the effective symbol time)
FIG.7C Guard correlation signal
FIG.7D Count (N)
FIG.7E Peak timing (Np)
FIG.7F Validity flag

OFDM DEMODULATOR

TECHNICAL FIELD

The present invention relates to a demodulator destined for demodulation of OFDM (orthogonal frequency division multiplex) modulated signal.

This application claims the priority of the Japanese Patent Application No. 2002-382214 filed on Dec. 27, 2002, the entirety of which is incorporated by reference herein.

BACKGROUND ART

For transmission of digital signals, there is available a modulation technique called "OFDM" (orthogonal frequency division multiplex). The OFDM technique is such that data is digitally modulated for transmission by dividing a transmission frequency band into many orthogonal sub-carriers and assigning the data to the amplitude and phase of each of the sub-carriers by the phase shift keying (PSK) and quadrature amplitude modulation (QAM).

The OFDM technique is characterized in that since a transmission frequency band is divided into many sub-carriers, so the band per sub-carrier is narrower and the modulation rate is lower, while the transmission rate is not totally so different from that in the conventional modulation technique. The OFDM technique is also characterized in that since many sub-carriers are transmitted in parallel, so the symbol rate is lower and the time length of a multipath in relation to that of a symbol can be reduced so that the OFDM technique will not easily be affected by the multipath fading.

Also, the OFDM technique is characterized in that since data is assigned to a plurality of sub-carriers, so a transmission/reception circuit can be formed from an inverse fast Fourier transform (IFFT) calculation circuit in order to modulate the data, while it can be formed from a fast Fourier transform (FFT) calculation circuit in order to demodulate the modulated data.

Because of the above-mentioned characteristics, the OFDM technique is frequently applied to the digital terrestrial broadcasting which is critically affected by the multipath fading. To the digital terrestrial broadcasting adopting the OFDM technique, there is applied the Digital Video Broadcasting-Terrestrial (DVB-T) standard, Integrated Services Digital Broadcasting-Terrestrial (ISDB-T) standard or the like, for example.

As shown in FIG. 1, the transmission symbol used in the OFDM technique (will be referred to as "OFDM symbol" hereunder) is formed from an effective symbol as a signal duration for which IFFT is effected for transmission of data, and a guard interval as a copy of the waveform of an end portion of the effective symbol. The guard interval is provided in the leading portion of the OFDM symbol. Owing to such a guard interval, the OFDM technique allows a multipath-caused inter-symbol fading and improves the multipath resistance.

In the mode 3 of the ISDB-$T_{SB}$ standard (broadcasting standard for the digital terrestrial broadcasting, adopted in Japan), the effective symbol includes 512 sub-carriers spaced 125/126 kHz (≈0.992 kHz) from one to a next one. Also in the mode 3 of the ISDB-$T_{SB}$ standard, transmission data is modulated to 433 of the 512 sub-carriers in the effective symbol. Further in the mode 3 of the ISDB-TSB standard, the length of time of the guard interval is ¼, ⅛, 1/16 or 1/32 of that of the effective symbol.

A conventional OFDM receiver will be illustrated and described.

FIG. 2 schematically illustrates the conventional OFDM receiver in the form of a block diagram.

As shown in FIG. 2, the conventional OFDM receiver, generally indicated with a reference 100, includes an antenna 101, tuner 102, band-pass filter (BPF) 103, A-D conversion circuit 104, DC canceling circuit 105, digital orthogonal demodulation circuit 106, FFT calculation circuit 107, frame extraction circuit 108, synchronization circuit 109, carrier demodulation circuit 110, frequency deinterleaving circuit 111, time deinterleaving circuit 112, demapping circuit 113, bit deinterleaving circuit 114, depuncture circuit 115, Viterbi circuit 116, byte deinterleaving circuit 117, spread-signal canceling circuit 118, transport stream generation circuit 119, RS decoding circuit 120, transmission-control information decoding circuit 121, and a channel selection circuit 122.

A transmission wave sent from a broadcast station is received by the antenna 101 of the OFDM receiver 100 and supplied as an RF signal to the tuner 102.

The RF signal received by the antenna 101 is converted in frequency by the tuner 102 composed of a multiplier 102$a$ and local oscillator 102$b$ into an IF signal, and the IF signal is supplied to the BPF 103. The oscillation frequency of a reception carrier signal generated by the local oscillator 102$b$ is changed correspondingly to a channel select frequency supplied from the channel selection circuit 122.

The IF signal from the tuner 102 is filtered by the BPF 103, and then digitized by the A-D conversion circuit 104. The digital IF signal thus produced has the DC component thereof canceled by the DC canceling circuit 105, and is supplied to the digital orthogonal demodulation circuit 106.

The digital orthogonal demodulation circuit 106 makes orthogonal demodulation of the digital IF signal with the use of a carrier signal of a predetermined frequency (carrier frequency) to provide a baseband OFDM signal. The orthogonal demodulation of the baseband OFDM signal provides a complex signal composed of a real-axis component (I-channel signal) and an imaginary-axis signal (Q-channel signal). The baseband OFDM signal from the digital orthogonal demodulation circuit 106 is supplied to the FFT calculation circuit 107 and synchronization circuit 109.

The FFT calculation circuit 107 makes FFT calculation of the baseband OFDM signal to extract a signal having been orthogonal-modulated to each sub-carrier, and provides it as an output.

The FFT calculation circuit 107 extracts a signal having an effective symbol length from one OFDM symbol and makes FFT calculation of the extracted signal. More specifically, the FFT calculation circuit 107 removes a signal having a guard interval length from one OFDM symbol, and makes FT calculation of the residual of the OFDM symbol. Signals for FFT calculation may be extracted from any arbitrary positions in one OFDM symbol if the signal extraction points are consecutive. Namely, the signal extraction will start at any position in a range from the leading boundary of the OFDM symbol (indicated with a reference A in FIG. 1) to the end of the guard interval (indicated with a reference B in FIG. 1) as shown in FIG. 1.

A signal extracted by the FFT calculation circuit 107 and having been modulated to each sub-carrier is a complex signal composed of a real-axis component (I-channel signal) and an imaginary-axis component (Q-channel signal). The signal extracted by the FFT calculation circuit 107 is supplied to the frame extraction circuit 108, synchronization circuit 109 and carrier demodulation circuit 110.

Based on the signal demodulated by the FFT calculation circuit 107, the frame extraction circuit 108 extracts boundaries of an OFDM transmission frame, while demodulating pilot signals such as CP, SP, etc. included in the OFDM transmission frame and transmission-control information such as TMCC, TPS, etc., and supplies the demodulated pilot signals and transmission-control information to the synchronization circuit 109 and transmission-control information demodulation circuit 121.

Using the base-band OFDM signal, signals having been modulated to the sub-carriers after demodulated by the FFT calculation circuit 107, pilot signals such as CP, SP, etc. detected by the frame extraction circuit 108 and channel select signal supplied from the channel selection circuit 122, the synchronization circuit 109 calculates boundaries of the OFDM symbol, and sets an FFT-calculation start timing for the FFT calculation circuit 107.

The carrier demodulation circuit 110 is supplied with signals demodulated from the sub-carrier outputs from the FFT calculation circuit 107, and makes carrier demodulation of the supplied signal. For demodulation of an ISDB-$T_{SB}$-based OFDM signal, for example, the carrier demodulation circuit 110 will makes differential demodulation of the signal by the DQPSK technique or synchronous demodulation by the QPSK, 16QAM or 64QAM technique.

The carrier-demodulated signal undergoes frequency-directional deinterleaving by the frequency deinterleaving circuit 111, then time-directional deinterleaving by the time deinterleaving circuit 112, and is supplied o the demapping circuit 113.

The demapping circuit 113 makes demapping of the carrier-demodulated signal (complex signal) to restore the transmission data series. For demodulation of an ISDB-$T_{SB}$-based OFDM signal, for example, the demapping circuit 113 will make demapping corresponding to the QPSK, 16QAM or 64QAM technique.

Being passed through the bit deinterleaving circuit 114, depuncture circuit 115, Viterbi circuit 116, byte deinterleaving circuit 117 and spread-signal canceling circuit 118, the transmission data series output from the demapping circuit 113 undergoes deinterleaving corresponding to a bit deinterleaving for distribution of a multi-valued symbol error, puncturing for reduction of transmission bits, Viterbi decoding for decoding a convolution-encoded bit string, deinterleaving in bytes, and energy despreading corresponding to the energy spreading, and the transmission data series thus processed is supplied to the transport stream generation circuit 119.

The transport stream generation circuit 119 inserts data defined by each broadcasting technique, such as null packet, in a predetermined position in a data stream. Also, the transport stream generation circuit 119 "smoothes" bit spaces in an intermittently supplied data stream to provide a temporally continuous stream. The transmission data series thus smoothed is supplied to the RS decoding circuit 120.

The RS decoding circuit 120 makes Reed-Solomon decoding of the supplied transmission data series, and provides the transmission data series thus decoded as a transport stream defined in the MPEG-2 Systems.

The transmission-control information decoding circuit 121 decodes transmission-control information having been modulated in a predetermined position in the OFDM transmission frame, such as TMCC or TPS. The decoded transmission-control information is supplied to the carrier demodulation circuit 110, time deinterleaving circuit 112, demapping circuit 113, bit deinterleaving circuit 114 and transport stream generation circuit 119, and used to control the demodulation, reproduction, etc. effected in these circuits.

Note here that for demodulation of an OFDM signal, it is necessary to correctly detect boundaries of the OFDM symbol and make FFT calculation synchronously with the boundary positions. The correct detection of boundary positions of an OFDM symbol for synchronization of the ODFM symbols is called "symbol synchronization".

The boundary position of an OFDM symbol is not always coincident with the operation clock for the receiver. The start timing of the FFT calculation can only be controlled in units of the operation clock for the receiver. On this account, even if a boundary position has been calculated accurately with OFDM symbols being synchronized with each other, FFT calculation will result in an error whose precision is smaller than the cycle of the operation clock of the OFDM signal, as shown in FIG. 3.

The error smaller than the operation clock cycle can be canceled by synchronizing the operation clocks by means of a clock reproduction circuit such as a PLL, for example. For example, in a receiver in which no operation-clock PLL is done of a received OFDM signal, however, the canceling of the error is extremely complicated. To cancel an error smaller than the operation clock cycle, it has been proposed to calculate a phase rotation of a pilot signal, which however will lead to a slower synchronization pull-in and to a complicated circuit.

DISCLOSURE OF THE INVENTION

Accordingly, the present invention has an object to overcome the above-mentioned drawbacks of the related art by providing a simply constructed OFDM demodulator capable of a high-speed, high-accuracy correction of a difference of less than the operation clock cycle between an extraction position for Fourier transform and a boundary position of a received transmission.

The above object can be attained by providing an OFDM demodulator for demodulating an orthogonal frequency division multiplex (OFDM) signal whose unit of transmission is a transmission symbol including effective symbols generated by making time division of an information series and modulating the information into a plurality of sub-carriers and a guard interval generated by copying the signal waveform of a part of the effective symbols, the apparatus including, according to the present invention, a reference time generating circuit for generating a reference time on the basis of a reference clock; a Fourier transform circuit for extracting a complex signal modulated in each sub-carrier of the transmission symbol by extracting signal areas corresponding to the number of sub-carriers for the effective symbols of the OFDM signal sampled with the reference clock and making Fourier transform of the extracted signal areas; a guard correlation peak time detecting circuit for detecting a timing in which the autocorrelation of the guard interval portion of the OFDM signal attains to its peak and generating the timing (peak time) synchronous with the reference time; a symbol-boundary time estimating circuit for estimating, on the basis of the peak time, a symbol-boundary time that is a boundary time of the transmission symbol synchronous with the reference time; a timing control circuit for controlling the timing position where the signal are extracted by the Fourier transform circuit on the basis of the symbol-boundary time represented by the precision of the reference clock cycle; and a phase correcting circuit for calculating a phase-correction amount on the basis of the symbol-boundary time represented by a precision smaller than the reference clock cycle and making, on the basis of the calculated phase-correction amount, phase correction of the complex signal having been modulated in each sub-carrier and extracted by the Fourier transform circuit.

The above OFDM demodulator according to the present invention is very simply constructed without using any clock reproduction circuit such as PLL and phase-rotation detection circuit using a pilot signal, and can correct a difference whose precision is smaller than the operation clock cycle between the extraction position for the Fourier transform and boundary position of the received transmission symbol with a higher pull-in speed and higher precision.

These objects and other objects, features and advantages of the present invention will become more apparent from the following detailed description of the best mode for carrying out the present invention when taken in conjunction with the accompanying drawings.

BRIEF DESCRIPTION OF THE DRAWINGS

FIG. 7 is a timing diagram of each signal in the guard correlation/peak detection circuit.

BEST MODE FOR CARRYING OUT THE INVENTION

The present invention will be described in detail below concerning the OFDM receiver as an embodiment thereof.

Overview of the OFDM Receiver

Figure 1:
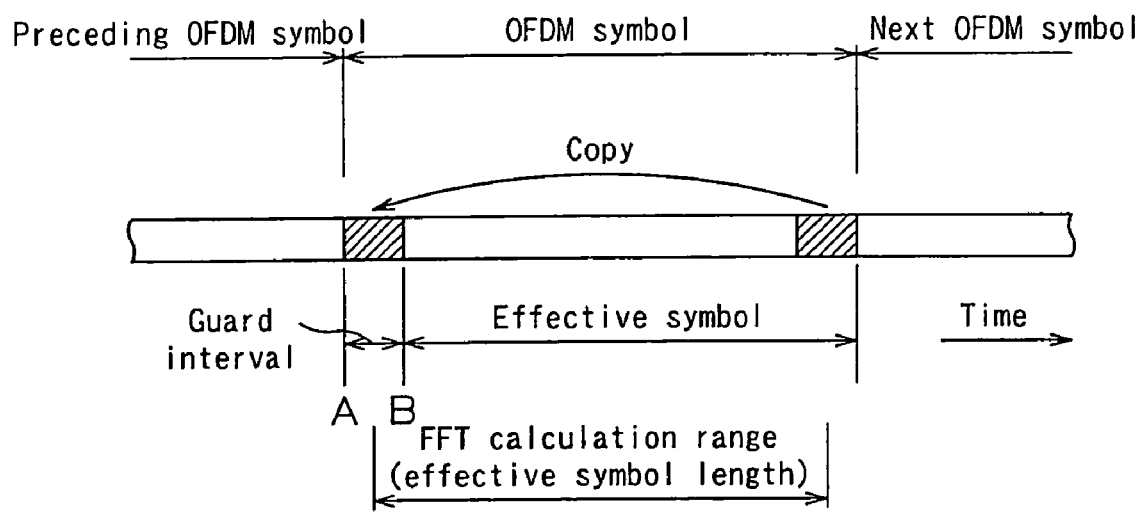
FIG. 1 explains the transmission symbol used in the OFDM technique.
Figure 2:
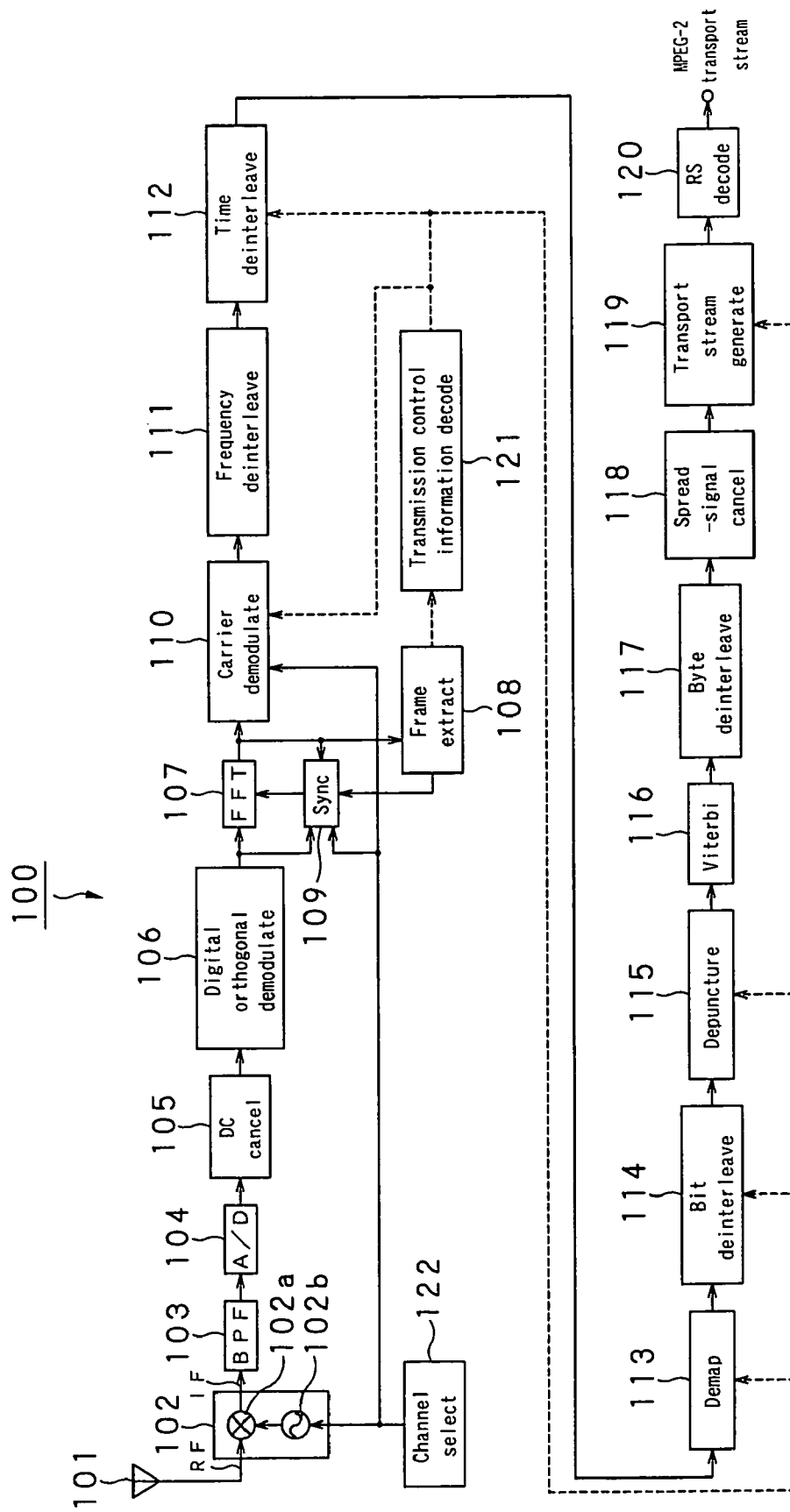
FIG. 2 is a block diagram of the conventional OFDM receiver.
Figure 3:
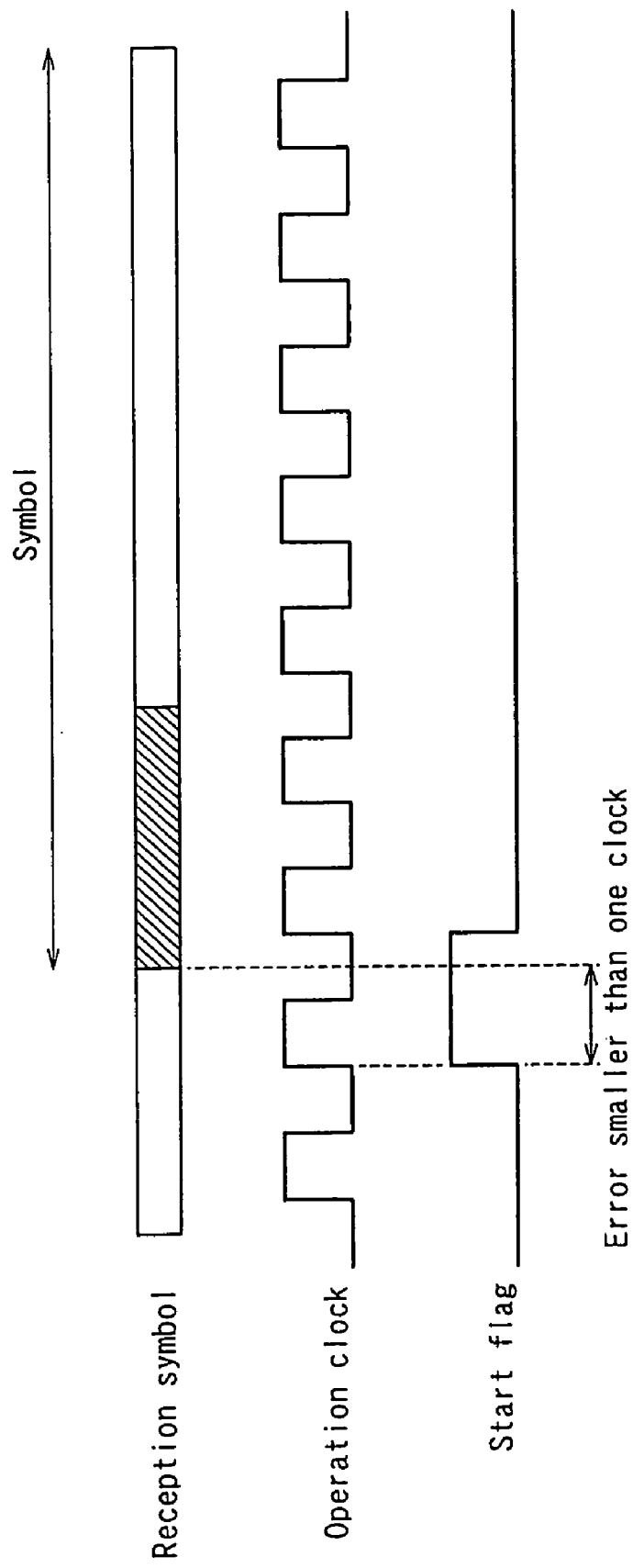
FIG. 3 explains a positional shift of a start flag indicating a start position of the FFT calculation from an OFDM symbol-boundary position.
Figure 4:
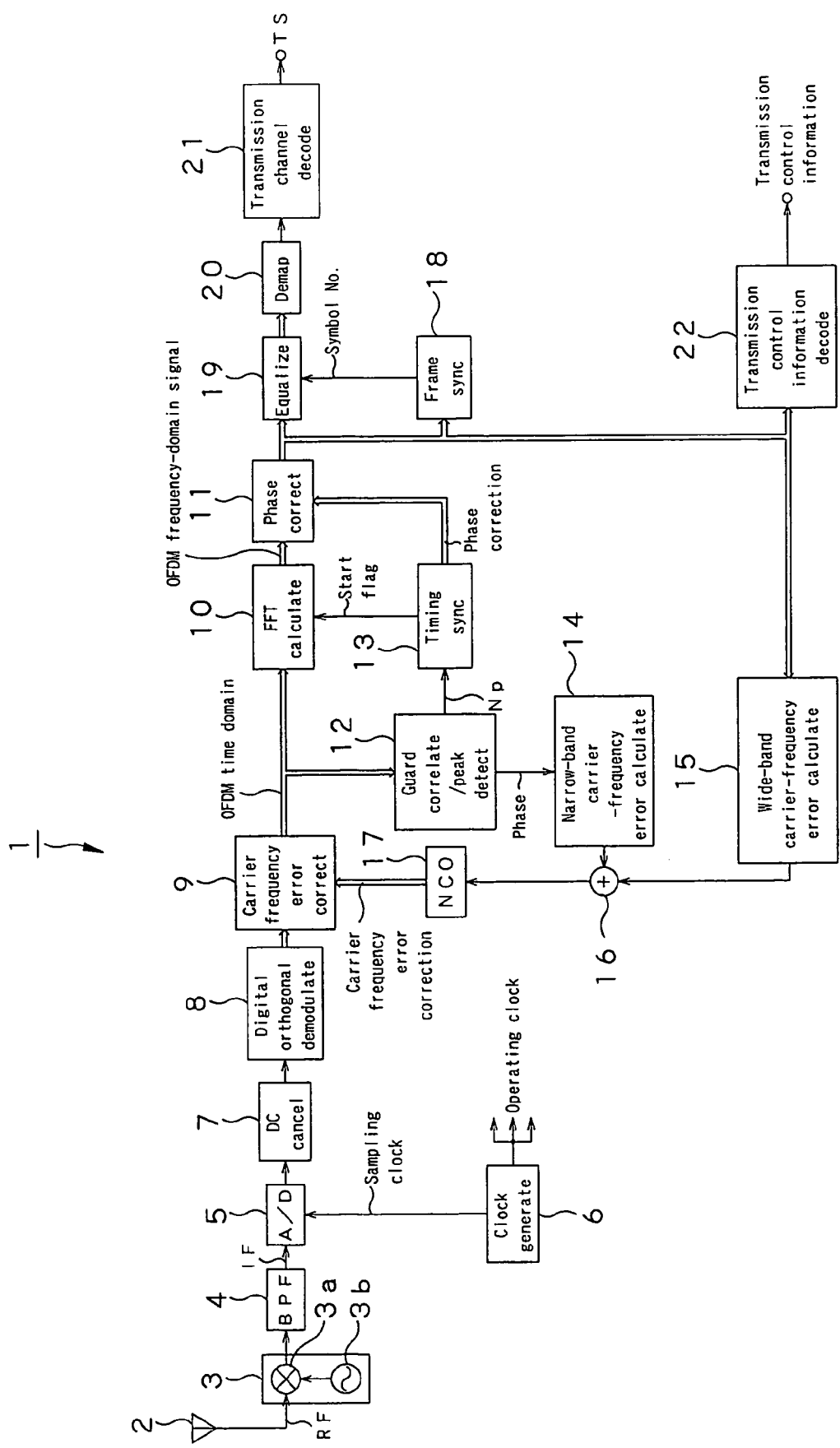
FIG. 4 is a block diagram of an OFDM receiver as an embodiment of the present invention.

FIG. 4 is a block diagram of the OFDM receiver as an embodiment of the present invention.

As show in FIG. 4, the OFDM receiver, generally indicated with a reference 1, as the embodiment of the present invention includes an antenna 2, tuner 3, band-pass filter (BPF) 4, A-D conversion circuit 5, clock generation circuit 6, DC canceling circuit 7, digital orthogonal demodulation circuit 8, carrier-frequency error correction circuit 9, FFT calculation circuit 10, phase correction circuit 11, guard correlation/peak detection circuit 12, timing synchronization circuit 13, narrow-band carrier error calculation circuit 14, wide-band carrier error calculation circuit 15, addition circuit 16, numerical-control oscillation (NCO) circuit 17, frame synchronization circuit 18, equalization circuit 19, demapping circuit 20, transmission-channel decoding circuit 21, and a transmission-control information decoding circuit 22.

Digital broadcast waves from a broadcast station are received by the antenna 2 of the OFDM receiver 1, and supplied as a RF signal to the tuner 3.

The RF signal received by the antenna 2 is converted in frequency to an IF signal by the tuner 3 including the multiplier 3a and local oscillator 3b, and supplied to the BPF 4. The IF signal output from the tuner 3 is filtered by the BPF 4 and then supplied to the A-D conversion circuit 5.

The A-D conversion circuit 5 samples the IF signal with a clock supplied from the clock generation circuit 6, and digitizes the IF signal. The IF signal thus digitized by the A-D conversion circuit 5 is supplied to the DC canceling circuit 7 where it will have the DC component thereof canceled, and the signal is supplied to the digital orthogonal demodulation circuit 8. The digital orthogonal demodulation circuit 8 makes orthogonal demodulation of the digital IF signal with the use of a two-phase carrier signal of a predetermined carrier frequency, and provides a base-band OFDM signal as an output. An OFDM time-domain signal output from the digital orthogonal demodulation circuit 8 is supplied to the carrier-frequency error correction circuit 9.

Note here that for the digital orthogonal demodulation, the digital orthogonal demodulation circuit 8 needs a two-phase signal having a −Sin component and Cos component as a carrier signal. On this account, in the OFDM receiver 1, the frequency of the sampling clock supplied to the A-D conversion circuit 5 is made four times higher than the center frequency $f_{IF}$ of the IF signal to generate a two-phase carrier signal for supply to the digital orthogonal demodulation circuit 8.

Also, in the OFDM receiver 1, after completion of the digital orthogonal demodulation, a data series of a clock of $4f_{IF}$ is down-sampled to 1/4 to equalize the number of samples of the effective symbol having undergone the digital orthogonal demodulation to the number (Nu) of sub-carriers. That is, the clock for the data series subjected to the digital orthogonal demodulation has a frequency that is 1/sub-carrier space. Also, the down-sampling rate after the digital orthogonal demodulation may be ½ to make FFT calculation with the number of samples, double the normal one, and the data series be further down-sampled to ½ after completion of the FFT calculation. By making the FFT calculation with the number of samples, double the normal one, it is possible to extract, by the FFT calculation, a signal in a two-time wider frequency band and thus reduce the circuit scale of the low-pass filter circuit for the digital orthogonal demodulation. It should be noted that for each of the downstream circuits to process the over-sampled data series, the number (Nu) of samples of the effective symbol having undergone the digital orthogonal demodulation may be $2^n$ times (n is a natural number) larger than the number of sub-carriers.

The clock generation circuit 6 supplies the A-D conversion circuit 5 with a clock of the aforementioned frequency, and each of the circuits of the OFDM receiver 1 with an operation clock for the data series having undergone the digital orthogonal demodulation (a clock of a frequency equal to a quarter of the frequency of the clock for supply to the A-D conversion circuit 5, for example, a clock of a frequency equal to 1/sub-carrier space).

Note that the operation clock generated by the clock generation circuit 6 is a free-running clock not synchronous with a transmission clock for the received OFDM signal. That is, the operation clock from the clock generation circuit 6 free-runs without synchronization in frequency and phase with the transmission clock by PLL or the like. The operation clock can free-run because the timing synchronization circuit 13 detects a frequency error between the OFDM signal transmission clock and the operation clock, and cancels the frequency error on the basis of the frequency error component by a feed-forwarding made in the system downstream of the timing synchronization circuit 13. Although in this OFDM receiver 1, the clock generation circuit 6 generates an asynchronous free-running clock as above, the present invention is applicable to a device that can vary the operation flock frequency by a feedback control.

Also, the base-band OFDM signal output from the digital orthogonal demodulation circuit 8 is a so-called time-domain signal not yet subject to FFT calculation. Thus, the yet-to-FFT-calculated baseband signal will be referred to as "OFDM time-domain signal" hereunder. The OFDM time-domain signal is orthogonal-demodulated to provide a complex signal composed of a real-axis component (I-channel signal) and an imaginary-axis component (Q-channel signal).

The carrier-frequency error correction circuit 9 makes complex multiplication of a carrier-frequency error correction signal output from the NCO 17 by the OFDM time-domain signal having undergone the digital orthogonal demodulation to correct a carrier-frequency error of the OFDM time-domain signal. The OFDM time-domain signal having the carrier-frequency error thereof corrected by the carrier-frequency error correction circuit 9 is supplied to the FFT calculation circuit 10 and guard correlation/peak detection circuit 12.

The FFT calculation circuit 10 makes FFT calculation of the number (Nu) of samples of the effective symbol by extracting a signal having the effective symbol length from one OFDM symbol, that is, extracting a signal resulted from canceling of the number (Ng) of samples of a guard interval from the total number (Ns) of samples of the one OFDM symbol. The FFT calculation circuit 10 is supplied with the start flag (start timing of the FFT calculation) which identifies a range of extraction from the timing synchronization circuit 13, and makes FFT calculation in timing of the start flag.

Figure 5:
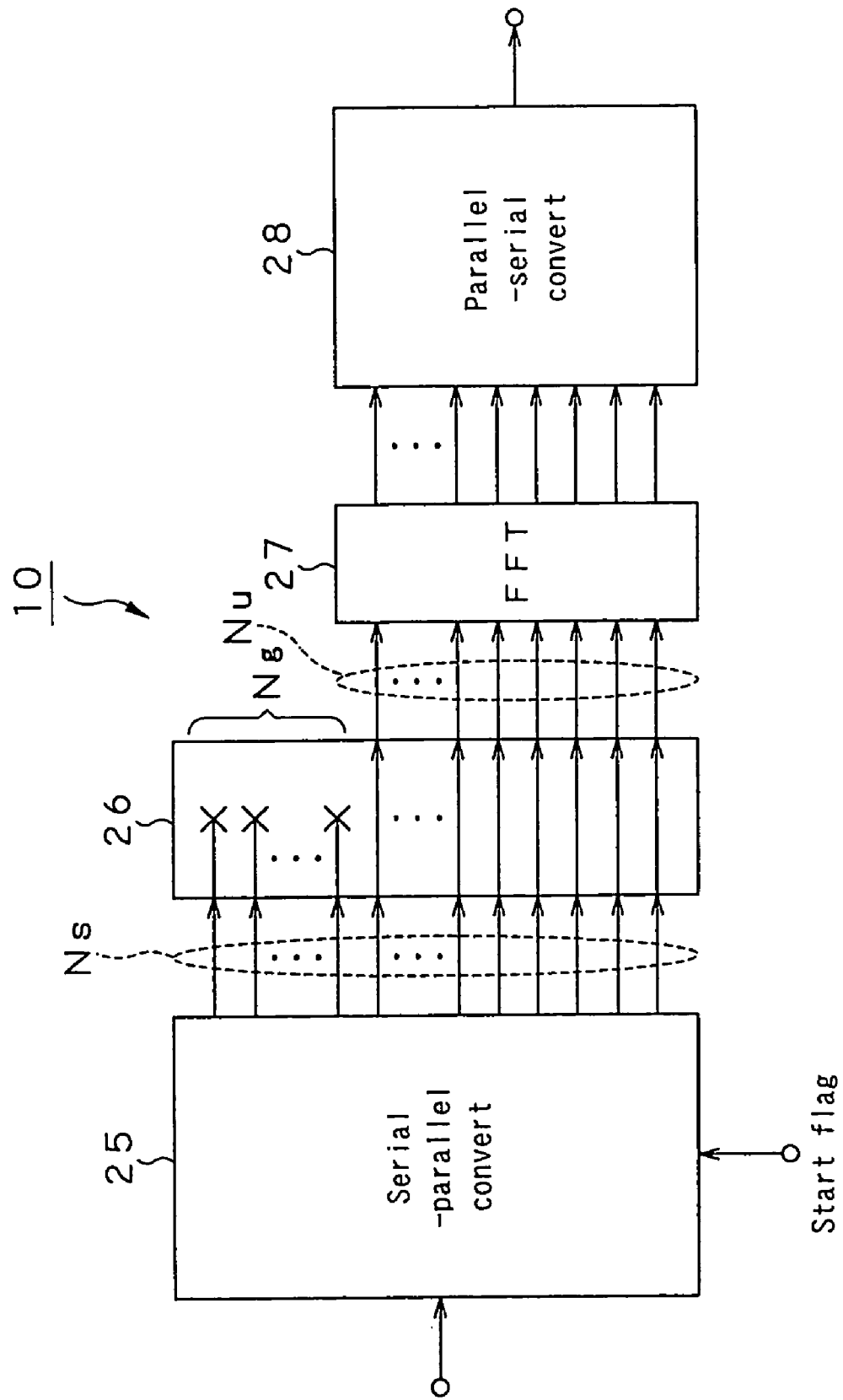
FIG. 5 shows the construction of an FFT calculation circuit.

As shown in FIG. 5, the FFT calculation circuit 10 includes a serial-parallel conversion circuit 25, guard interval canceller 26, FFT calculator 27, and a parallel-serial conversion circuit 28, for example.

The serial-parallel converter 25 starts counting at a start flag supplied from the timing synchronization circuit 13, extracts data for the number (Ns) of samples of the OFDM symbol, and outputs parallel data whose one word is Ns. The guard interval canceller 26 allows the top Nu data of the parallel data whose one word is Ns samples to pass by without outputting the Ng data next to the word. The FFT calculator 27 make FFT calculation of data for the number (Nu) of samples of the effective symbol supplied from the guard interval canceller 26. The parallel-serial converter 28 is supplied with data for the number (Nu) of sub-carriers from the FFT calculator 27. The parallel-serial converter 28 outputs the Nu data after serializing the latter.

The FFT calculation circuit 10 extracts a signal component having been modulated in sub-carriers in one OFDM symbol by extracting data for the number of samples in the effective symbol from the OFDM symbol and making FFT calculation of the data.

The signal output from the FFT calculation circuit 10 is a so-called frequency-domain signal having undergone the FFT calculation. Thus, the FFT-calculated signal will be referred to as "OFDM frequency-domain signal" hereunder. Also, the OFDM frequency-domain signal output from the FFT calculation circuit 10 is a complex signal composed of a real-axis component (I-channel signal) and imaginary-axis signal (Q-channel signal) similarly to the OFDM time-domain signal. The OFDM frequency-domain signal is supplied to the phase correction circuit 11.

The phase correction circuit 11 corrects a phase-rotated component that will be caused in the OFDM frequency-domain signal by a shift of an actual boundary position of an OFDM symbol from the start timing of the FFT calculation. The phase correction circuit 11 corrects a phase shift caused with a precision smaller than the sampling cycle. More specifically, the phase correction circuit 11 corrects a phase rotation of the PFDM frequency-domain signal output from the FFT calculation circuit 10 by making complex multiplication of a phase correction signal (complex signal) supplied from the timing synchronization circuit 13. The OFDM frequency-domain signal corrected in phase rotation is supplied to the wideband carrier error calculation circuit 15, frame synchronization circuit 18, equalization circuit 19 and transmission-control information decoding circuit 22.

The guard correlation/peak detection circuit 12 is supplied with the OFDM time-domain signal. The guard correlation/peak detection circuit 12 will determine the value of a correlation between the supplied OFDM time-domain signal and OFDM time-domain signal delayed by the effective symbol. It should be noted here that the length of time for which the correlation is to be determined is set to the length of the guard interval time.

Thus, the signal indicating the correlation value (will be referred to as "guard correlation signal" hereunder) has a peak precisely in the boundary position of the OFDM symbol. The guard correlation/peak detection circuit 12 detects the position where the guard correlation signal has a peak, and outputs a value (peak timing value Np) identifying the timing of the peak position.

The peak timing value Np from the guard correlation/peak detection circuit 12 is supplied to the timing synchronization circuit 13, and the phase of the correlation value in the peak timing is supplied to the narrow-band carrier-error calculation circuit 14.

The timing synchronization circuit 13 determines a start timing of FFT calculation on the basis of a boundary position of the OFDM symbol, estimated by filtering, for example, the peak timing value Np from the guard correlation/peak detection circuit 12. The FFT-calculation start timing is supplied as a start flag to the FFT calculation circuit 10. The FFT calculation circuit 10 will make FFT calculation by extracting a signal within the range of FFT calculation from the supplied OFDM time-domain signal on the basis of the start flag. Also, the timing synchronization circuit 13 calculates the amount of a phase rotation taking place due to a time lag between the estimated boundary position of the OFDM symbol and the timing in which the FFT calculation is to be started, generates a phase correction signal (complex signal) on the basis of the calculated amount of phase rotation, and supplies the phase correction signal to the phase correction circuit 11.

The narrow-band carrier-error calculation circuit 14 calculates, based on the phase of the correlation value in the boundary position of the OFDM symbol, a narrow-band carrier-frequency error component indicating a narrow-band component of a shift of the center frequency used for the digital orthogonal demodulation. More particularly, the narrow-band carrier-frequency error component is a shift of the center frequency, whose precision is less than $\pm\frac{1}{2}$ of the frequency space of the sub-carrier. The narrow-band carrier-frequency error component determined by the narrow-band carrier-error calculation circuit 14 is supplied to the addition circuit 16.

The wide-band carrier-error calculation circuit 15 calculates, based on the OFDM frequency-domain signal from the phase correction circuit 11, a narrow-band carrier-frequency error component indicating a wide-band component of a shift of the center frequency used for the digital orthogonal demodulation. The wide-band carrier-frequency error component is a shift of the center frequency, whose precision is the sub-carrier frequency space.

The wide-band carrier-frequency error component determined by the wideband carrier-error calculation circuit 15 is supplied to the addition circuit 16.

The addition circuit 16 adds the narrow-band carrier-frequency error component calculated by the narrow-band carrier-error detection circuit 14 and the wide-band carrier-frequency error component calculated by the wide-band carrier-error calculation circuit 15 to calculate a total shift of the center frequency of the baseband OFDM signal supplied from the carrier-frequency error correction circuit 9. The addition circuit 16 outputs the calculated total shift of the center frequency as a frequency error value. The frequency error value from the addition circuit 16 is supplied to the NCO 17.

The NCO 17 is a so-called numerical-controlled oscillator, and generates a carrier-frequency error correction signal of which the oscillation frequency is increased or decreased correspondingly to the value of a frequency error from the addition circuit 16. The NCO 17 increases the oscillation frequency of a carrier-frequency error correction signal when the supplied frequency-error value is positive, and decreases the oscillation frequency when the supplied frequency-error value is negative. The NCO 17 provides the above control to generate a carrier-frequency error correction signal of which the oscillation frequency becomes stable when the frequency-error value is zero.

The frame synchronization circuit 18 detects a synchronization word inserted in a predetermined position in an OFDM transmission frame to detect the start timing of the OFDM transmission frame. The frame synchronization circuit 18 identifies a symbol number assigned to each OFDM symbol on the basis of the start timing of the OFDM transmission frame, and supplies the symbol number to the equalization circuit 19 etc.

The equalization circuit 19 makes a so-called equalization of the OFDM frequency-domain signal. The equalization circuit 19 detects, based on the symbol number supplied from the frame synchronization circuit 18, a pilot signal called "scattered pilots (SP)" inserted in the OFDM frequency-domain signal. The OFDM frequency-domain signal equalized by the equalization circuit 19 is supplied to the demapping circuit 20.

The demapping circuit 20 makes a data demapping of the equalized OFDM frequency-domain signal (complex signal), corresponding to the technique of demodulation such as QPSK, 16QAM or 64QAM, used for the OFDM frequency-domain signal, to restore the transmission data. The transmission data from the demapping circuit 20 is supplied to the transmission-channel decoding circuit 21.

The transmission-channel decoding circuit 21 makes transmission-channel decoding of the supplied transmission data, corresponding to the broadcasting method by which the transmission data has been broadcast. For example, the transmission-channel decoding circuit 21 makes a time deinterleaving corresponding to a time-directional interleaving, frequency deinterleaving corresponding to a frequency-directional interleaving, deinterleaving corresponding to a bit interleaving for distributing multi-valued symbol error, depucturing corresponding to a pucturing for reduction of transmission bits, Viterbi decoding for decoding a convolution-encoded bit string, deinterleaving in bytes, energy despreading corresponding to the energy spreading, error correction corresponding to the RS (Reed-Solomon) coding, etc.

The transmission data having undergone the above transmission-channel decoding is outputted as a transport stream defined in the MPEG-2 Systems, for example.

The transmission-control information decoding circuit 22 decodes transmission-control information such as TMCC, TPS or the like, modulated in a predetermined position in the OFDM transmission frame.

Guard Correlation/Peak Detection Circuit

Next, the guard correlation/peak detection circuit 12 will be illustrated and described.

Note that constants Nu, Ng and Ns (natural numbers) will be used in the following illustration and description. The constant Nu is the number of samples in one effective symbol. The constant Ng is the number of samples in the guard interval. For example, when the length of the guard interval is ¼ of that of the effective symbol, Ng=Nu/4. The constant Ns is the number of samples in one OFDM symbol. That is, Ns=Nu+Ng.

Figure 6:
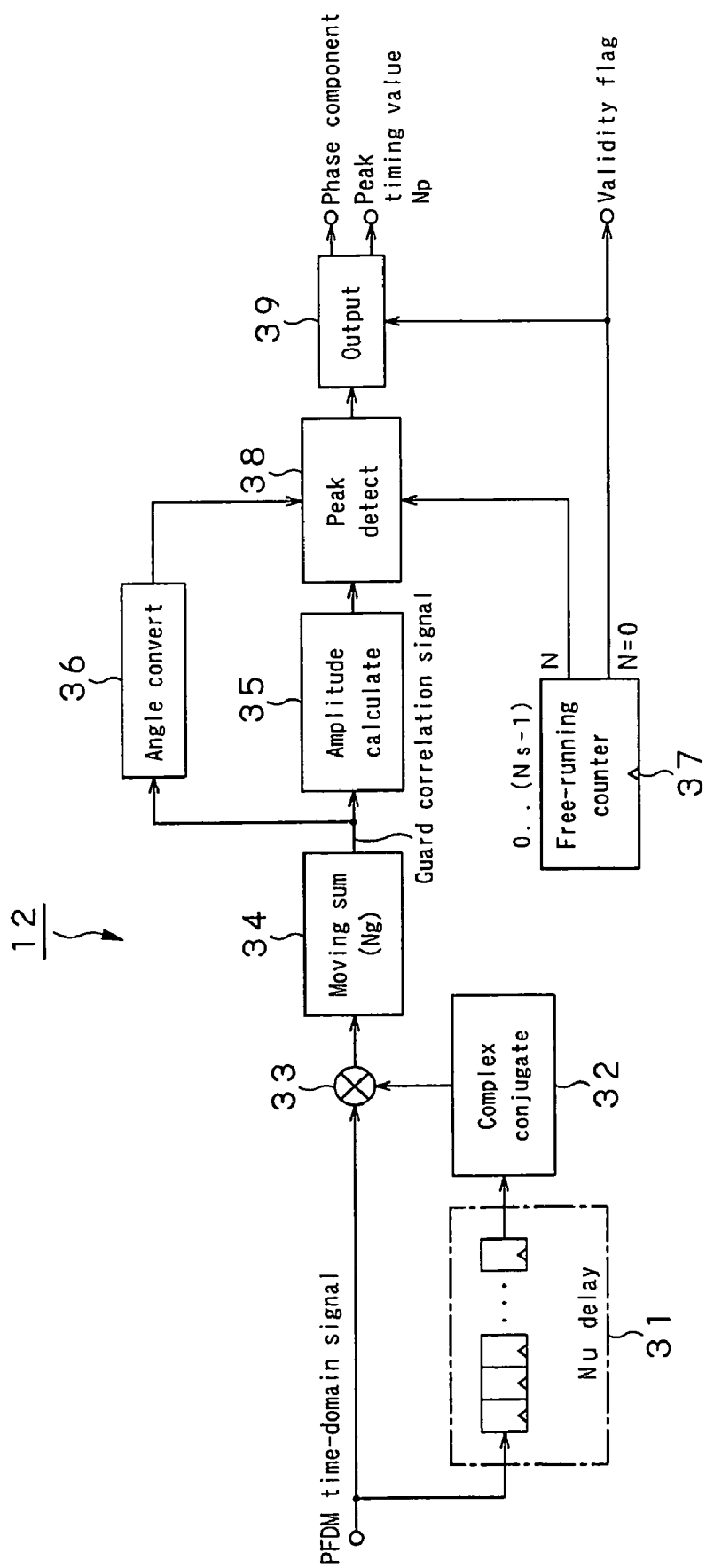
FIG. 6 is a block diagram of a guard correlation/peak detection circuit.

FIG. 6 is a block diagram of the guard correlation/peak detection circuit 12, and FIG. 7 is a timing diagram of various signals in the guard correlation/peak detection circuit 12.

As shown in FIG. 6, the guard correlation/peak detection circuit 12 includes a delay circuit 31, complex conjugate circuit 32, multiplication circuit 33, moving-sum circuit 34, amplitude calculation circuit 35, angle conversion circuit 36, free-running counter 37, peak detection circuit 38, and an output circuit 39.

The OFDM time-domain signal (see FIG. 7A) from the carrier-frequency error correction circuit 9 is supplied to the delay circuit 31 and multiplication circuit 33. The delay circuit 31 is a shift register formed from Nu register groups to delay the input OFDM time-domain signal by the effective symbol time. The OFDM time-domain signal (see FIG. 7B) delayed by the effective symbol by the delay circuit 31 is supplied to the complex conjugate circuit 32.

The complex conjugate circuit 32 calculates a complex conjugate of the OFDM time-domain signal delayed by the effective symbol time, and supplies it to the multiplication circuit 33.

The multiplication circuit 33 multiplies the OFDM time-domain signal (see FIG. 7A) and the complex conjugate of the OFDM time-domain signal delayed by the effective symbol time (see FIG. 7B) at every one sample. The result of the multiplication is supplied to the moving-sum circuit 34.

The moving-sum circuit 34 includes a shift register formed for Ng register groups and an adder to calculate a sum of values in the registers, for example. For each of the Ng samples, it makes moving-sum calculation of the results of multiplication sequentially supplied at every one sample. The moving-sum circuit 34 will output a guard correlation signal (see FIG. 7C) indicating the correlation between the OFDM time-domain signal and the OFDM time-domain signal delayed by the effective symbol (Nu samples). The guard correlation signal from the moving-sum circuit 34 is supplied to the amplitude calculation circuit 35 and angle conversion circuit 36.

The amplitude calculation circuit 35 determines an amplitude component of the guard correlation signal by squaring the real-number part and imaginary-number part, respectively, of the guard correlation signal, and adding the squares and calculating a square root of the result of the addition. The amplitude component of the guard correlation signal is supplied to the peak detection circuit 38.

The angle conversion circuit 36 determines a phase component of the guard correlation signal by making Tan−1 calculation of the real-number part and imaginary-number part of the guard correlation signal. The phase component of the guard correlation signal is supplied to the peak detection circuit 38.

The free-running counter 37 counts the operation clock. The count N of the free-running counter 37 is incremented in steps of one in a range from 0 to Ns−1, and will return to zero when it exceeds Ns−1 (as in FIG. 7D). That is to say, the free-running counter 37 is a cyclic counter whose cycle is the number of samples (Ns) in the OFDM symbol period. The count N of the free-running counter 37 is supplied to the peak detection circuit 38.

The peak detection circuit 38 detects a point where the amplitude of the guard correlation signal is highest in one cycle (0 to Ns−1) of the free-running counter 37, and detects a count at that point. When the count of the free-running counter 37 shifts to a next cycle, the peak detection circuit 38 will detect a new point where the guard correlation signal has a high amplitude. The count detected by the peak detection circuit 38 is a peak timing Np indicative of a time at which the guard correlation signal attains its peak (peak time). Also, the peak detection circuit 38 detects a phase component of the guard correlation signal at the peak time, and supplies the detected phase component to the output circuit 39.

The output circuit 39 takes in the count from the peak detection circuit 38 and stores it into an internal register in a timing when the count N of the free-running counter 37 becomes zero, and sets the count to a state in which is can be outputted to outside (see FIG. 7E). The count stored in the register is supplied as information indicative of the peak time of the guard correlation signal (peak timing Np) to the timing synchronization circuit 13 located downstream. Similarly, the output circuit 39 takes in the phase component from the peak detection circuit 38 in a timing when the count N of the free-running counter 37 becomes zero, and stores it into the internal register, and sets the phase component to a state in which it can be outputted to outside. The phase component stored in the register is supplied to the narrow-band carrier-error calculation circuit 14 located downstream.

Also, the free-running counter 37 issues a validity flag that becomes High when the count N becomes zero (see FIG. 7F). The validity flag indicates a timing of issuing the peak timing Np and phase value to the downstream circuit.

Note that although the guard correlation/peak detection circuit 12 is constructed to generate the peak timing Np at each OFDM symbol, it may be constructed to generate the peak timing Np at every M OFDM symbols (M is a natural number), not at each OFDM symbol. In this case, however, the validity flag should be set to High (1) only once at every M OFDM symbols.

Timing Synchronization Circuit

Next, the timing synchronization circuit 13 will be illustrated and described.

The timing synchronization circuit 13 accurately synchronizes the OFDM symbols with each other by canceling an error and fluctuation of the peak timing Np caused in a multipath and fading environment.

Figure 8:
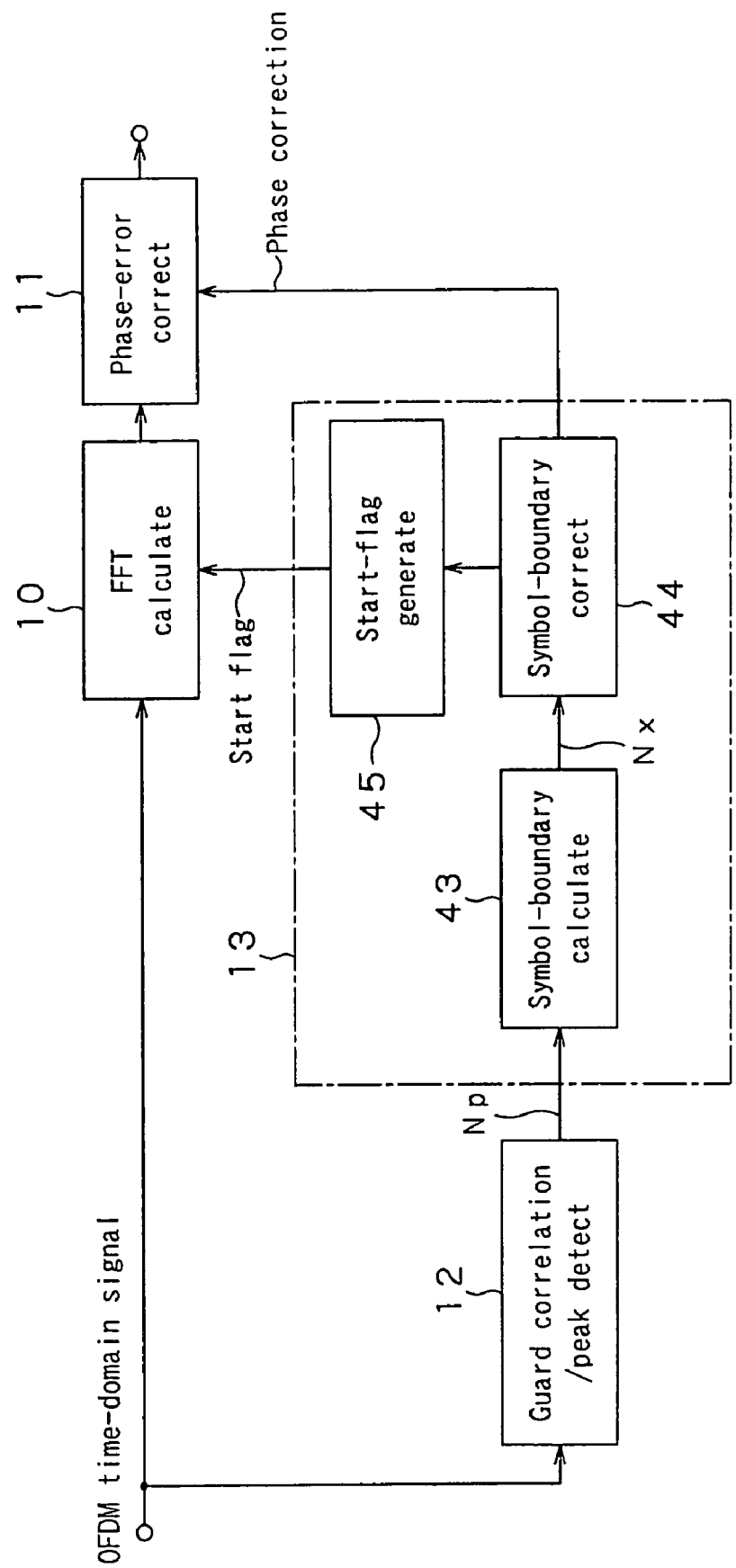
FIG. 8 is a block diagram of a timing synchronization circuit.

FIG. 8 shows the internal construction of the timing synchronization circuit 13.

As shown in FIG. 8, the timing synchronization circuit 13 includes a symbol-boundary calculation circuit 43, symbol-boundary correction circuit 44, and a start-flag generation circuit 45.

The timing synchronization circuit 13 is supplied with the peak timing Np from the guard correlation/peak detection circuit 12 at every M OFDM symbols (M is a natural number). Each circuit in the timing synchronization circuit 13 has its operation controlled in an input timing of the peak timing Np (at every M OFDM symbols).

The symbol-boundary calculation circuit 43 filters the peak timing Np supplied at every M OFDM symbols, and calculates a symbol-boundary position Nx indicative of the boundary position of the OFDM symbol. The symbol-boundary position Nx is represented by a range of 0 to Ns as a cycle of the free-running counter 37 in the guard correlation/peak detection circuit 12. However, the symbol-boundary position Nx has a precision that is after the decimal point while the free-running counter 37 and peak timing Np have a precision of an integer. The symbol-boundary calculation circuit 43 calculates a phase difference between an output (symbol-boundary position Nx) and input (peak timing Np), and filters it on the basis of the phase error component to stabilize the output (symbol-boundary position Nx).

The symbol-boundary position Nx from the symbol-boundary calculation circuit 43 is supplied to the symbol-boundary correction circuit 44.

The symbol-boundary correction circuit 44 detects an integer component of the symbol-boundary position Nx supplied at every M symbols, and calculates a start time for the FFT calculation. The calculated start time is supplied to the start-flag generation circuit 45. Also, the symbol-boundary correction circuit 44 determines a time lag, whose precision is smaller than the operation-clock cycle, between the symbol-boundary time and FFT-calculation start timing by detecting a component of the symbol-boundary position Nx, which is after the decimal point, and calculates, on the basis of the determined time lag, a phase rotation of a signal component included in each sub-carrier having undergone the FFT calculation. The calculated phase rotation is converted into a complex signal, and then supplied to the phase correction circuit 11.

The start-flag generation circuit 45 generates, based on the start time supplied from the symbol-boundary correction circuit 44, a start flag with which a timing of signal extraction (that is, an FFT-calculation start timing) for the FFT calculation is identified. his start flag is generated at each OFDM symbol. It should be noted that the start flag may be generated with a delay of a predetermined margin time from the supplied symbol-boundary position Nx. However, the margin time should never exceed at least the length of time of the guard interval. By generating the start flag with a delay of the predetermined margin time from the symbol-boundary time as above, it is possible to cancel an inter-symbol interference caused by the detection of a preceding symbol boundary which is a ghost, for example.

Symbol-boundary Calculation Circuit

Next, the symbol-boundary calculation circuit 43 will be illustrated and explained.

The symbol-boundary calculation circuit 43 is supplied with the peak timing Np from the guard correlation/peak detection circuit 12, and estimates a symbol-boundary position Nx by making DLL (delay locked loop) filtering on the basis of the peaking timing Np.

(Peak Timing Np, and Symbol-boundary Position Nx)

First, the peak timing Np and symbol-boundary position Nx will be explained.

The peak timing Np indicates a peak position of the guard correlation signal detected by the guard correlation/peak detection circuit 12, and the symbol-boundary position Nx indicates a boundary position of the OFDM symbol of the received OFDM signal.

The peak timing Np and symbol-boundary position Nx take values, respectively, within a range of a value counted by the free-running counter 37 in the guard correlation/peak detection circuit 12. That is, each of the peak timing Np and symbol-boundary position Nx takes a value ranging from 0 to Ns. Since the peak timing Np is a count output from the free-running counter 37, so it takes a value ranging from 0 to Ns whose precision is an integer. The symbol-boundary position Nx is a value ranging from 0 to Ns whose precision is after the decimal point as well.

Since the free-running counter 37 in the guard correlation/peak detection circuit 12 runs freely counting the operation clock for the OFDM receiver 1, so the count therefrom may be regarded as a reference time for the OFDM receiver 1. Also, the count per cycle of the free-running counter 37 is set to the number Ns of samples (sum of the number Nu of samples in the effective symbol and number Ng of samples in the guard interval) in one symbol of the OFDM signal. Therefore, each of the peak timing Np and symbol-boundary position Nx represents a time synchronous with the free-running counter 37. In other words, they represent a phase relative to the symbol period of the OFDM signal.

Since in the OFDM receiver 1, a value within the range of the number Ns of samples in one symbol of the OFDM signal is used to generate a peak timing Np and symbol-boundary position Nx, so it is possible to easily control the synchronization of the symbol-boundary positions taking place repeatedly.

(Internal Construction of the Symbol-boundary Calculation Circuit)

Next, the internal construction of the symbol-boundary calculation circuit 43 will be described.

Figure 9:
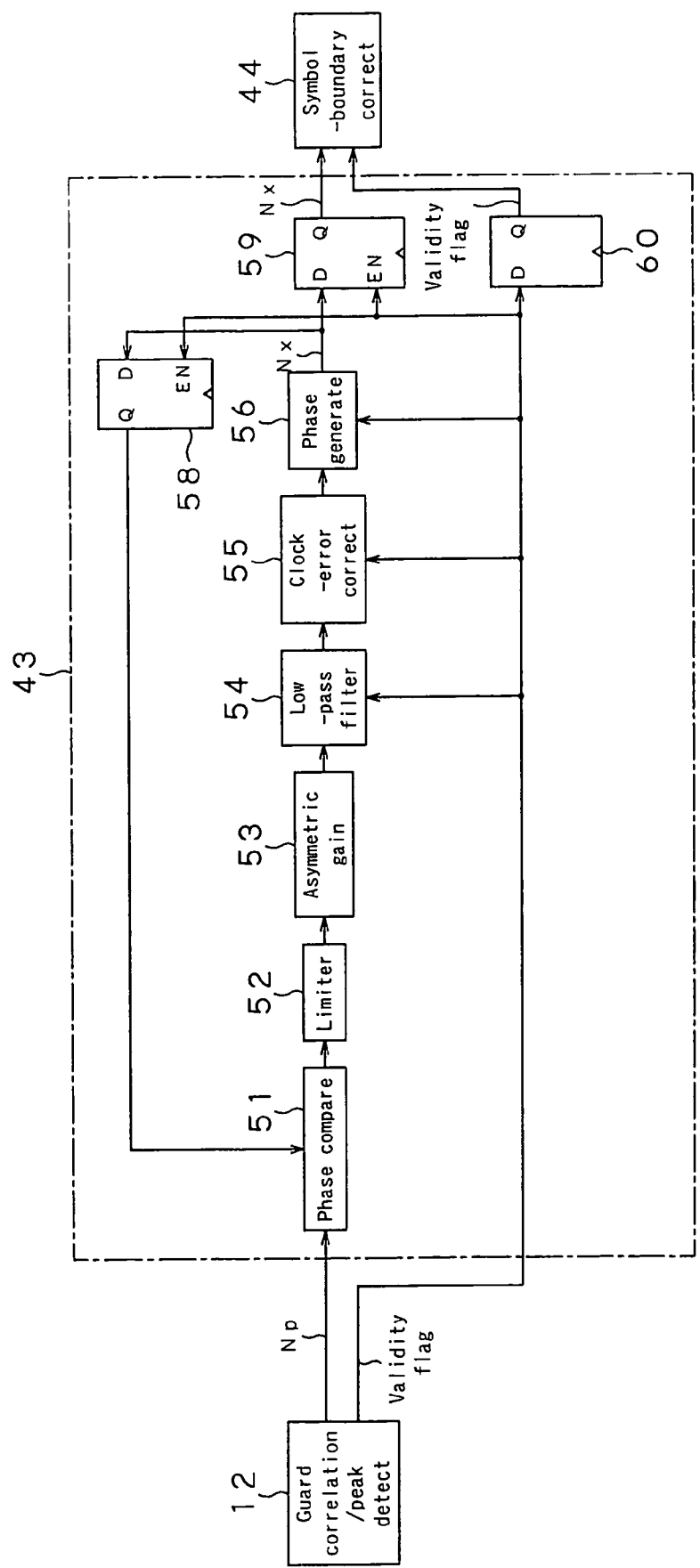
FIG. 9 is a block diagram of a symbol-boundary calculation circuit.

FIG. 9 is a circuit diagram of the symbol-boundary calculation circuit 43.

As shown in FIG. 9, the symbol-boundary calculation circuit 43 includes a phase comparison circuit 51, limiter 52, asymmetric gain circuit 53, low-pass filter 54, clock-error correction circuit 55, phase generation circuit 56, first register 58, second register 59, and a third register 60.

The symbol-boundary calculation circuit 43 is supplied with the peak timing Np and validity flag. The validity flag becomes High (1) at every M symbols (M is a natural number) synchronously with the cyclic timing of the free-running counter 37. The symbol-boundary calculation circuit 43 calculates a symbol-boundary position Nx in each timing when the validity flag becomes High.

(Phase Comparison Circuit)

Figure 10:
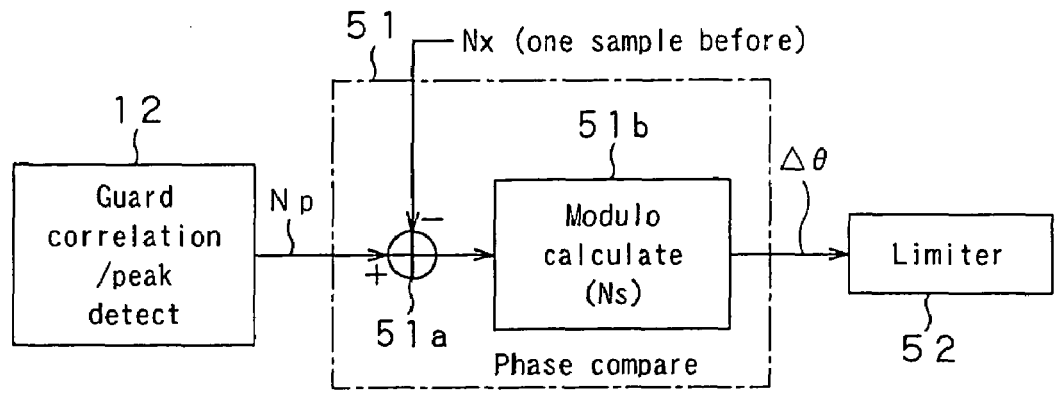
FIG. 10 is a circuit diagram of a phase comparison circuit included in the symbol-boundary calculation circuit.

FIG. 10 is a circuit diagram of the phase comparison circuit 51.

The phase comparison circuit 51 includes a subtracter 51a and modulo calculator 51b. The phase comparison circuit 51 is supplied with the peak timing Np from the guard correlation/peak detection circuit 12, and also with the symbol-boundary position Nx from the symbol-boundary calculation circuit 43 by feedback. The symbol-boundary position Nx supplied to the phase comparison circuit 51 is outputted from the symbol-boundary calculation circuit 43 one sample before the input timing of the peak timing Np outputted from the guard correlation/peak detection circuit 12 (namely, in the last timing when the validity flag has become High).

The symbol-boundary position Nx is supplied to the phase comparison circuit 51 via the first register 58.

The subtracter 51a subtracts the symbol-boundary position Nx from the peak timing Np. The modulo calculator 51b calculates the output from the subtracter 51a to determine a subtraction residual per Ns (number of samples from one symbol). That is, the modulo calculator 51b divides the output from the subtracter 51a by Ns (number of samples from one symbol) to provide the residual of the division.

The phase comparison circuit 51 constructed as above calculates a difference $\Delta\theta$ between a symbol-boundary phase being currently estimated and the peak phase of a current guard correlation signal on the assumption that the count of the free-running counter 37 is regarded as a symbol period. Namely, it calculates a difference between a current estimated symbol-boundary time and the peak time of a current guard correlation signal on the assumption that the count of the free-running counter 37 is regarded as a reference time.

The phase difference $\Delta\theta$ calculated by the phase comparison circuit 51 is supplied to the limiter 52.

(Limiter)

Figure 11:
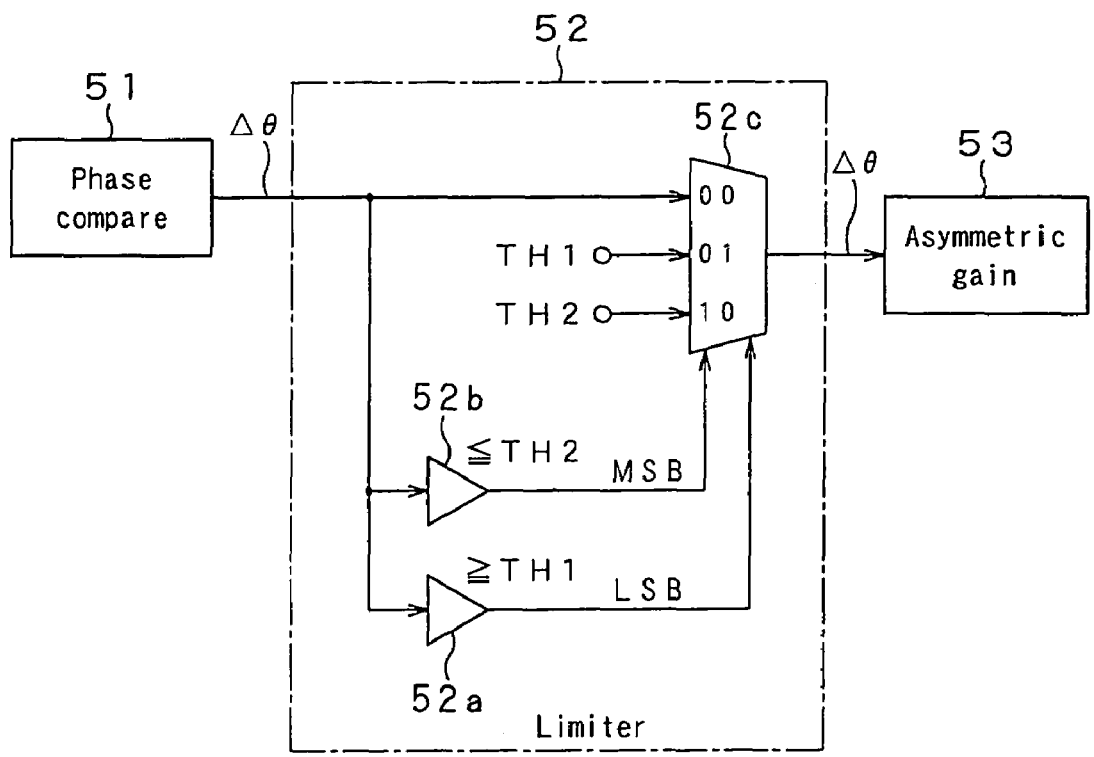
FIG. 11 is a circuit diagram of a limiter included in the symbol-boundary calculation circuit.

FIG. 11 is a circuit diagram of the limiter 52.

The limiter 52 is supplied with the phase difference $\Delta\theta$ from the phase comparison circuit 51. The limiter 52 includes a first comparator 52a to make a comparison between an upper limit TH1 and phase difference $\Delta\theta$, a second comparator 52b to make a comparison between a lower limit TH2 and phase difference $\Delta\theta$, and a selector 52c to select any one of the phase difference $\Delta\theta$, upper value TH1 and lower value TH2. The relation in magnitude between the upper and lower limits TH1 and TH2 is TH1>TH2, The first comparator 52a outputs Low (0) when the phase difference $\Delta\theta$ is smaller than the upper limit TH1, or High (1) when the phase difference $\Delta\theta$ is larger than the upper limit TH1. The second comparator 52b outputs Low (0) when the phase difference $\Delta\theta$ is larger than the lower limit TH2, or High (1) when the phase difference $\Delta\theta$ is smaller than the lower limit TH2.

The selector 52c outputs the phase difference $\Delta\theta$ from the phase comparison circuit 51 as it is when the output from the first comparator 52a is Low (0) and output from the second comparator 52b is Low (0). The selector 52c outputs the upper limit TH1 when the output from the first comparator 52a is High (1), and the lower limit TH2 when the output from the second comparator 52b is High (1). Namely, the limiter 52 outputs the phase difference $\Delta\theta$ as it is when the supplied phase difference $\Delta\theta$ is between the upper and lower limits TH1 and TH2. It clips the output with the upper limit TH1 when the supplied phase difference Δθ is over the upper limit TH1, or with the lower limit TH2 when the supplied phase difference Δθ is below the lower limit TH2. Thus, the limiter 52 limits the level of the phase difference Δθ within a range of TH1>TH2.

Note that since the phase difference Δθ varies in the positive- and negative-going directions about "0", so the limiter 52 sets the upper limit TH1 to be equal to or larger than 0 and lower limit TH2 to smaller than or equal to 0.

Because of this limiter 52, the symbol-boundary calculation circuit 43 can cancel a large impulse noise caused in a fading environment, for example, to improve the synchronization holding performance.

The phase difference Δθ whose level has been limited by the limiter 52 is supplied to the asymmetric gain circuit 53.

(Asymmetric Gain Circuit)

Figure 12:
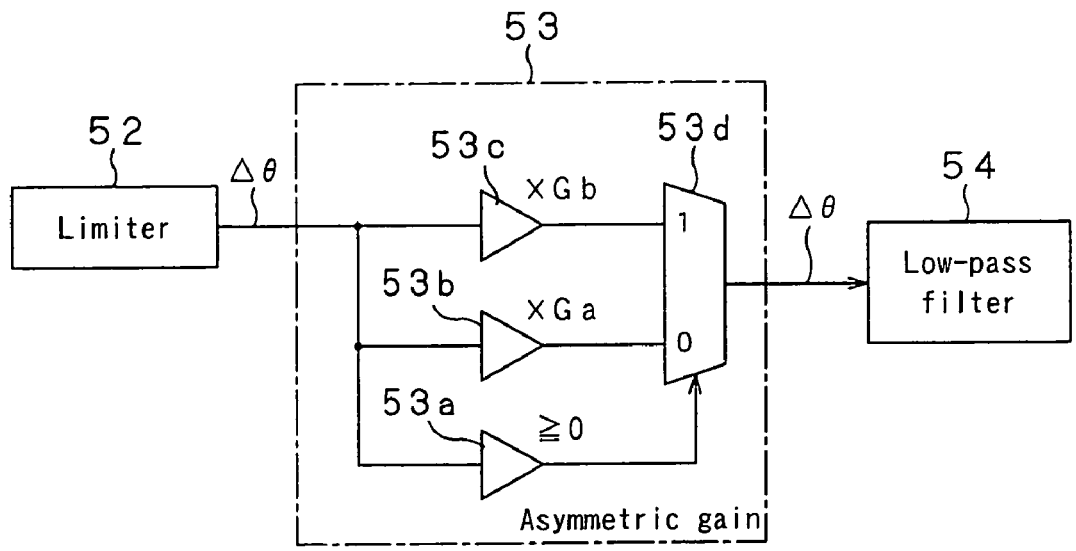
FIG. 12 is a circuit diagram of an asymmetric gain circuit included in the symbol-boundary calculation circuit.

FIG. 12 shows a circuit diagram of the asymmetric gain circuit 53.

The asymmetric gain circuit 53 is supplied with the phase difference Δθ which is an output from the limiter 52 and has been limited in level. The asymmetric gain circuit 53 includes a comparator 53a to determine the polarity of the phase difference Δθ, a first multiplier 53b to multiply the phase difference Δθ by a first gain Ga, a second multiplier 53c to multiply the phase difference Δθ by a second gain Gb, and a selector 53d to select an output from either the first or second multiplier 53b or 53c. The relation in magnitude between the first and second gains Ga and Gb is Ga>Gb.

The comparator 53a compares the phase difference Δθ with 0, and outputs Low (0) when the phase difference Δθ<0 and High (1) when the phase difference Δθ>0. The selector 53d selects and outputs an output (a product of the phase difference Δθ and Ga) from the first multiplier 53b when the output from the comparator 53a is Low (0), and an output (product of the phase difference Δθ and Gb) from the second comparator 53c when the output from the comparator 53a is High (1).

That is, the asymmetric gain circuit 53 judges whether the peak timing Np is earlier or later than the symbol-boundary position Nx. When the judgment is that the peak timing Np is earlier than the symbol-boundary position Nx, the asymmetric gain circuit 53 multiplies the phase difference by a smaller gain (Gb). When the peak timing Np is later than the symbol-boundary position Nx, the asymmetric gain circuit 53 multiplies the phase difference by a larger gain (Ga). Namely, in case a plurality of peak values is detected due to a multipath or the like, the asymmetric gain circuit 53 will multiply the phase difference Δθ by a different gain for synchronization with a temporarily earlier signal (main wave).

The phase difference Δθ multiplied by a gain by the asymmetric gain circuit 53 is supplied to the low-pass filter 54.

(Low-pass Filter)

Figure 13:
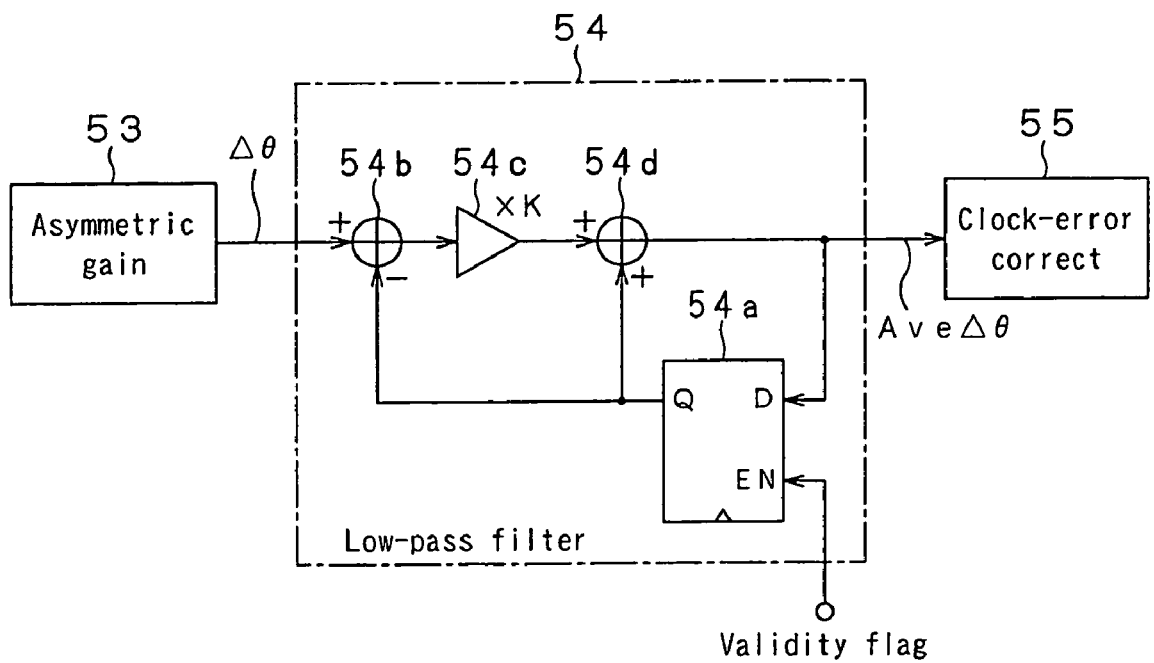
FIG. 13 is a circuit diagram of a low-pass filter included in the symbol-boundary calculation circuit.

FIG. 13 is a circuit diagram of the low-pass filter 54.

The low-pass filter 54 is supplied with the phase difference Δθ multiplied by a gain by the asymmetric gain circuit 53 and validity flag from the guard correlation/peak detection circuit 12. The low-pass filter 54 includes an enable register 54a, subtracter 54b, multiplier 54c, and an adder 54d.

The enable register 54a is supplied at an enable port EN thereof with the validity flag, and at an input port D thereof with the output (mean phase difference Ave Δθ) from the low-pass filter 54. The subtracter 54b subtracts an output from the register 54a from the phase difference Δθ from the asymmetric gain circuit 53. That is, the subtracter 54b subtracts the output (mean phase difference Ave Δθ) supplied from the low-pass filter 54 from the supplied phase difference Δθ in a one-sample earlier timing (the last timing in which the validity flag becomes High) to calculate a residual of the phase difference Δθ.

The multiplier 54c multiplies the residual of the phase difference Δθ from the subtracter 54b by a predetermined coefficient K. The adder 54d adds the residual multiplied by the predetermined coefficient K and the output from the register 54a. The output from the adder 54d is an output from the low-pass filter 54 (mean phase difference Ave Δθ).

That is, the low-pass filter 54 is an IIR type low-pass filter to average the supplied phase difference Δθ and calculate the mean phase difference Ave Δθ.

The mean phase difference Ave Δθ calculated by the low-pass filter 54 is supplied to the clock-error correction circuit 55.

(Clock-error Correction Circuit)

Figure 14:
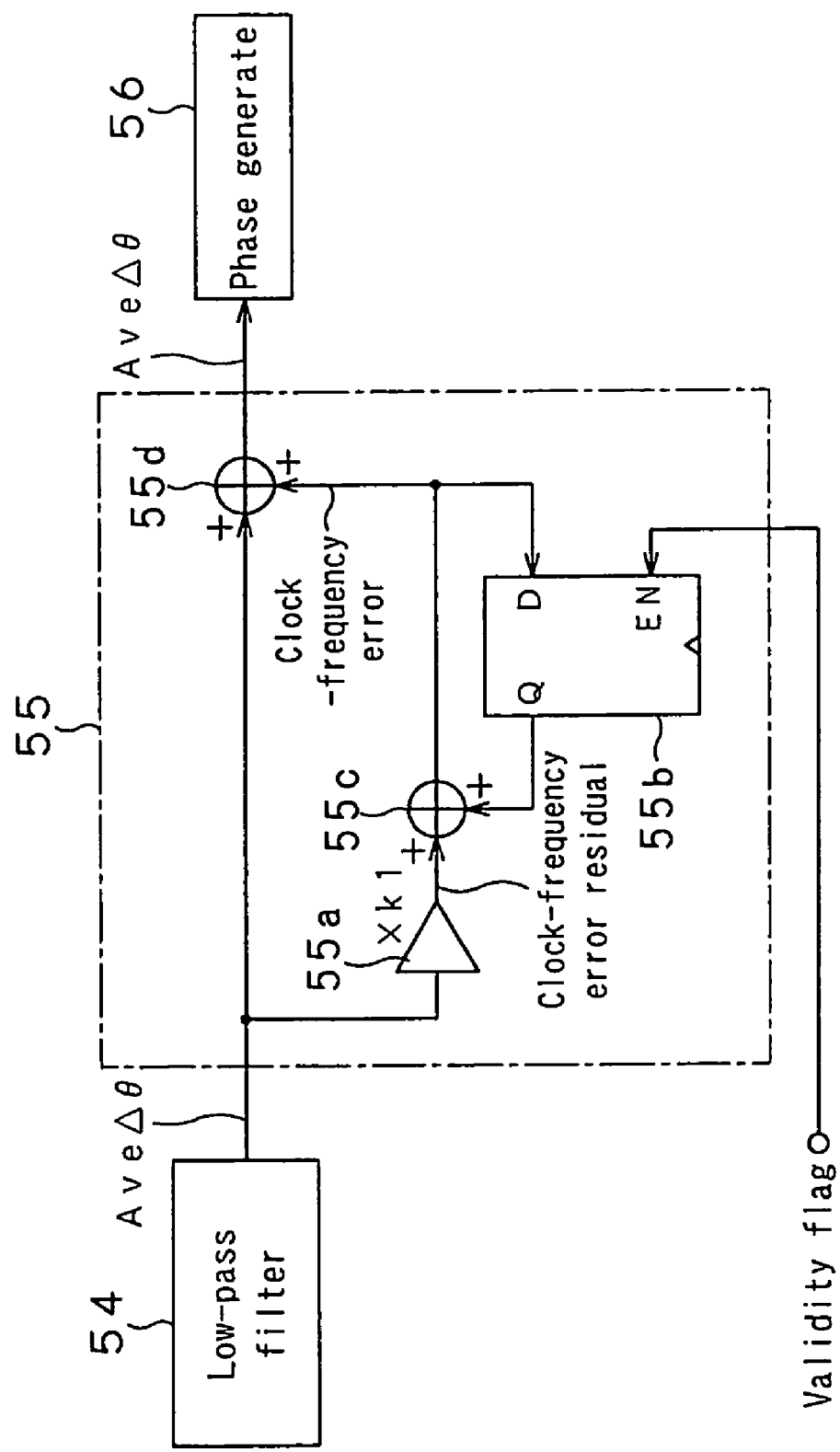
FIG. 14 is a circuit diagram of a clock-frequency error calculation circuit included in the timing synchronization circuit.

FIG. 14 is a circuit diagram of the clock-error correction circuit 55.

The clock-error correction circuit 55 is supplied with the mean phase difference Ave Δθ from the low-pass filter 54, and the validity flag from the guard correlation/peak detection circuit 12.

The clock-error correction circuit 55 includes a multiplier 55a, register 55b, first adder 55c and a second adder 55d.

The multiplier 55a multiplies the mean phase difference Ave Δθ from the low-pass filter 54 by a predetermined coefficient K1. The output from the multiplier 55a represents a residual component resulted from subtraction of a clock-frequency error from a specific symbol being processed from an estimated clock-frequency error. The residual component of the clock-frequency error can be calculated with the coefficient K1 being taken as a reciprocal of the number of samples for n samples (n is an interval of symbols for which the validity flag takes place), for example, that is, as 1/(n×Ns).

The register 55b stores a current estimated clock-frequency error. The adder 55c adds together the current estimated clock-frequency error stored in the register 55b and residual component from the multiplier 55a to calculate a new clock-frequency error.

The second adder 55d adds the clock-frequency error from the first adder 55c to the mean phase difference Av Δθ from the low-pass filter 54. The mean phase difference Ave Δθ having the clock-frequency error added thereto is supplied to the phase generation circuit 56.

The clock-error correction circuit 55 makes clock-frequency error correction of the mean phase difference Ave Δθ by adding the clock-frequency error to the mean phase difference Ave Δθ as above. Thus, the symbol-boundary calculation circuit 43 can synchronize symbols with an improved accuracy.

Note that the register 55b is an enable register. The register 55b is supplied at an enable port EN thereof with an input flag, and at an input port D with the output from the first adder 55c. Therefore, the register 55b stores an estimated clock-frequency error from the first adder 55c as a current estimated clock-frequency error.

The clock-frequency error can be calculated by cumulatively adding the residual components of the clock-frequency error. That is, the output from the multiplier 55a is cumulatively added, and the cumulative sum is taken as an estimated clock-frequency error when it becomes stable.

Because of such a clock-error correction circuit 55 provided in the symbol-boundary calculation circuit 43, the symbol boundary can be corrected using the clock-frequency error when calculating a symbol-boundary position. Thus, it is possible to calculate a symbol boundary more quickly and accurately.

(Phase Generation Circuit)

Figure 15:
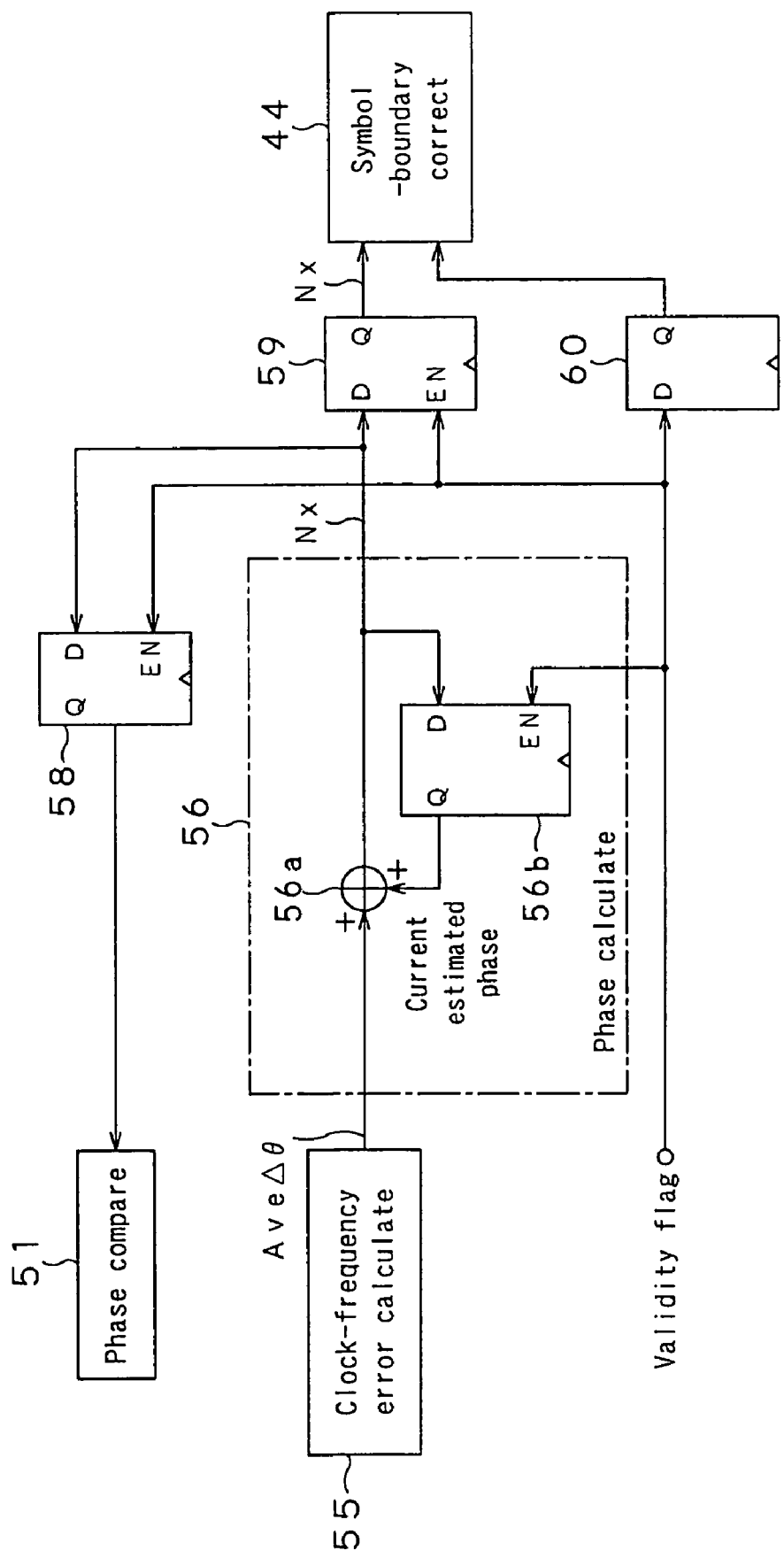
FIG. 15 is a circuit diagram of a phase generation circuit included in the symbol-boundary calculation circuit.

FIG. 15 is a circuit diagram of the phase generation circuit 56.

The phase generation circuit 56 is supplied with the mean phase difference Ave Δθ after a clock-frequency error component from the clock-error correction circuit 55 is corrected and validity flag from the guard correlation/peak detection circuit 12.

The phase generation circuit 56 includes an adder 56a and register 56b.

The register 56b has a current estimated phase stored therein.

The adder 56a is supplied with the mean phase difference Ave Δθ from the clock-error correction circuit 55, and current estimated phase from the register 56b. The adder 56a adds the mean phase difference Ave Δθ and current estimated phase to provide a symbol-boundary position Nx.

The phase generation circuit 56 calculates a symbol-boundary position Nx by adding the current estimated phase to the mean phase difference Ave Δθ. That is, the phase generation circuit 56 generates an output phase (symbol-boundary position Nx) indicating a final symbol-boundary position by adding a phase error component calculated on the path from the phase comparison circuit 51 to the clock-error correction circuit 55 to the current estimated phase. It should be noted that since the output phase (symbol-boundary position Nx) represents a phase of the period of the count (0 to Ns) generated by the free-running counter 37, so a value modulo-calculated with the count period (Ns) of the free-running counter 37 when the calculated output phase is over Ns or under 0.

Note that the register 56b is an enable register. The register 56b is supplied at an enable port EN thereof with an input flag, and at an input port D with the output from the first adder 56a. Therefore, the register 56b stores an estimated output from the first adder 56a as a current estimated phase. The current estimated phase can be calculated by cumulatively adding the phase residuals of the estimated phase. That is, the output from the adder 56a is cumulatively added, and the cumulative sum is taken as an estimated phase when it becomes stable.

Because of such a phase generation circuit 56 provided in the symbol-boundary calculation circuit 43, the symbol boundary can be corrected using the current estimated phase when calculating a symbol-boundary position. Thus, it is possible to calculate a symbol boundary more quickly and accurately.

The symbol-boundary position Nx from the phase generation circuit 56 is supplied to the first and second registers 58 and 59.

(Output Circuit, and Feed-back Circuit)

Each of the first and second registers 58 and 59 of the symbol-boundary calculation circuit 43 is an enable register.

The first register 58 is supplied at an enable portion EN thereof with the validity flag, and at an input port D with the output (symbol-boundary position Nx) from the phase generation circuit 56. The first register 58 is connected at the output port Q thereof to the phase comparison circuit 51. Therefore, the first register 58 delays the symbol-boundary position Nx by one sample (one effective symbol), and supplies it to the phase comparison circuit 51.

The second register 59 is supplied at an enable port EN thereof with the validity flag, and at an input port D with the output (symbol-boundary position Nx) from the phase generation circuit 56. The second register 59 is connected at an output port Q thereof to the symbol-boundary correction circuit 44. Therefore, the second register 59 delays the symbol-boundary position Nx by one sample (one effective symbol), and supplies it to the symbol-boundary correction circuit 44.

The third register 60 is a normal register which delays a signal input to the input port D by one clock, and delivers it at the output port Q. The third register 60 is supplied at an input port D thereof with the validity flag from the guard correlation/peak detection circuit 12, and has the output port Q thereof connected to the symbol-boundary correction circuit 44. Therefore, the third register 60 makes timing synchronization with the symbol-boundary position Nx, and supplies a validity flag to the symbol-boundary correction circuit 44.

Symbol-boundary Correction Circuit

Next, the symbol-boundary correction circuit 44 will be illustrated and described.

Figure 16:
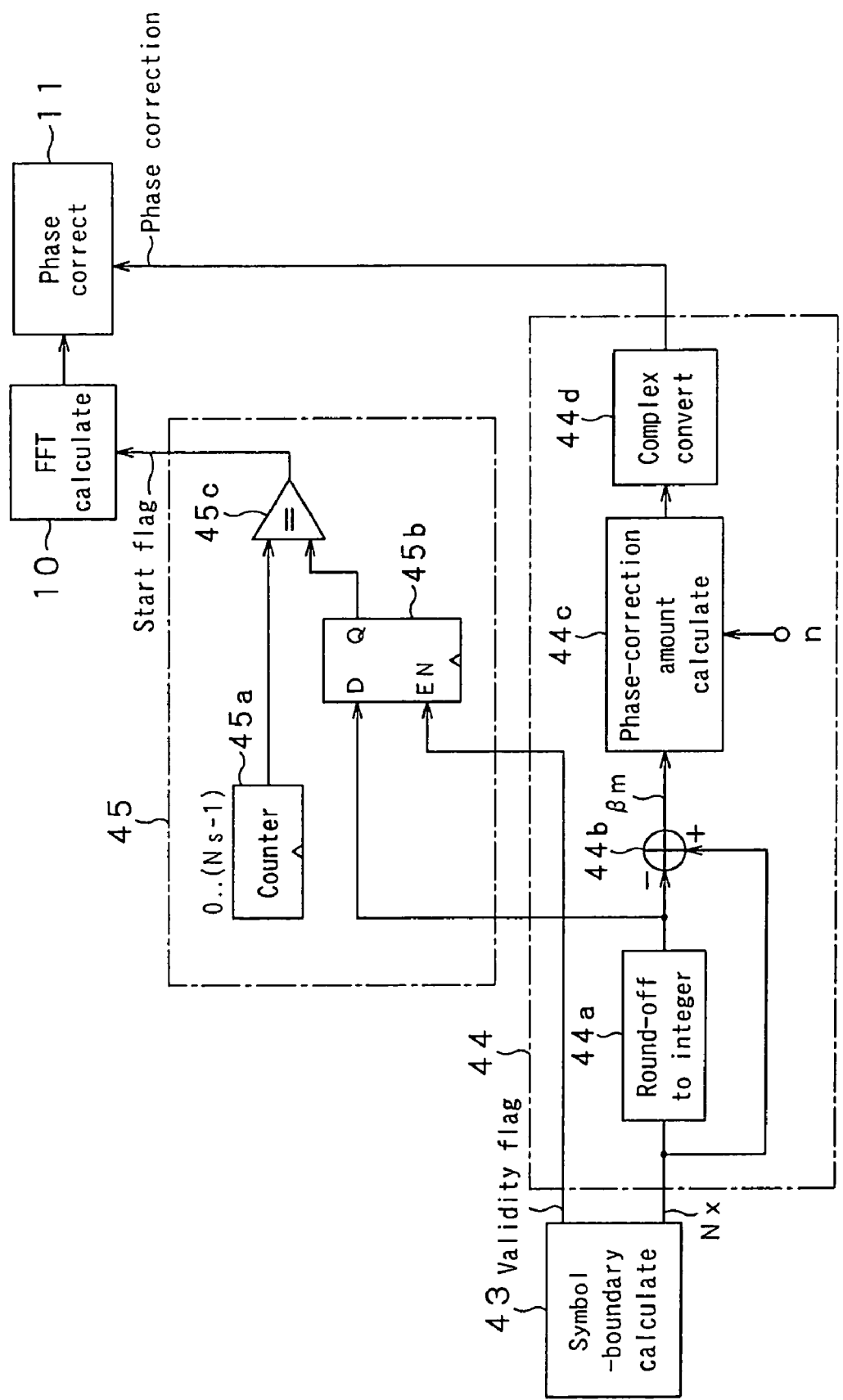
FIG. 16 is a circuit diagram of a symbol-boundary correction circuit and start-flag generation circuit.

FIG. 16 is a block diagram of the symbol-boundary correction circuit 44.

The symbol-boundary correction circuit 44 is supplied with the symbol-boundary position Nx from the symbol-boundary calculation circuit 43. The symbol-boundary position Nx has a value within the count cycle (0 to Ns) of the free-running counter 37 in the guard correlation/peak detection circuit 12. That is, the symbol-boundary position Nx is a value representing the symbol-boundary position of the PFDM signal by a phase relative to the period of the free-running counter 37. In other words, the symbol-boundary position Nx is a value represented by a reference time generated by the free-running counter 37 when it is assumed that the reference time is generated by the free-running counter 37.

Further, the symbol-boundary position Nx is filtered by the aforementioned symbol-boundary calculation circuit 43 to have the precision thereof expressed to less than the operation-clock cycle of the free-running counter 37. Namely, the symbol-boundary position Nx is a value ranging from 0 to Ns whose precision includes a value after the decimal point as well.

The symbol-boundary correction circuit 44 rewrites the symbol-boundary position Nx with an integer precision (that is the precision of the operation-clock cycle) to calculate the symbol-boundary position with the precision of the operation clock. Also, the symbol-boundary correction circuit 44 calculates a phase-error magnitude $\beta_m$ indicating a difference in precision smaller than the operation-clock cycle between the FFT-extraction timing and symbol-boundary timing on the basis of a precision, after the decimal point, of the symbol-boundary position Nx, and generates a phase correction signal for supply to the phase correction circuit 11 on the basis of the phase-error magnitude $\beta_m$.

The symbol-boundary correction circuit 44 is internally constructed as will be described below.

As shown in FIG. 16, the symbol-boundary correction circuit 44 includes an integral-rounding circuit 44a, subtracter 44b, phase-correction amount calculation circuit 44c, and a complex conversion circuit 44d.

The integral-rounding circuit 44a is supplied with the symbol-boundary position Nx calculated by the symbol-boundary calculation circuit 43. The integral-rounding circuit 44a rounds the supplied symbol-boundary position Nx to the value of operation-clock precision. That is, it rounds the symbol-boundary position Nx to an integer included in a range of 0 to Ns. For example, the integral-rounding circuit 44a makes integral rounding such as rounding down the symbol-boundary position Nx to a value after the decimal point, rounding up the symbol-boundary position Nx to a value after the decimal point or rounding off the symbol-boundary position Nx in relation to a value the decimal point. The integral-rounded symbol-boundary position Nx is supplied to the subtracter 44b. Further, the integral-rounded symbol-boundary position Nx is supplied as symbol-start information to the start-flag generation circuit 45 as well.

The subtracter 44b subtracts the symbol-boundary position Nx (integral-precision symbol-boundary position Nx) from the integral-rounding circuit 44a from the symbol-boundary position Nx (symbol-boundary position Nx expressed down to after the decimal point) from the symbol-boundary calculation circuit 43. The output from the subtracter 44b is a difference in a precision smaller than the operation-clock cycle between the FFT-extraction timing and symbol-boundary timing, that is, a phase-error magnitude $\beta_m$. The phase-error magnitude $\beta_m$ from the subtracter 44b is supplied to the phase-correction amount calculation circuit 44c.

The phase-correction amount calculation circuit 44c is supplied with the phase-error magnitude $\beta_m$ and the sub-carrier number n for each sub-carrier as well. The sub-carrier number n is supplied from the frame synchronization circuit 18 or the like, for example. The phase-correction amount calculation circuit 44c calculates, from the phase-error magnitude $\beta_m$, a correction amount $\theta_{clk}(n)$ for each sub-carrier as given by the following equation:

$$\theta_{clk}(n)=2\pi n\beta_m/N_u$$

where n indicates a sub-carrier number, $N_u$ indicates the number of effective symbols (that is, the number of sub-carriers).

Figure 17:
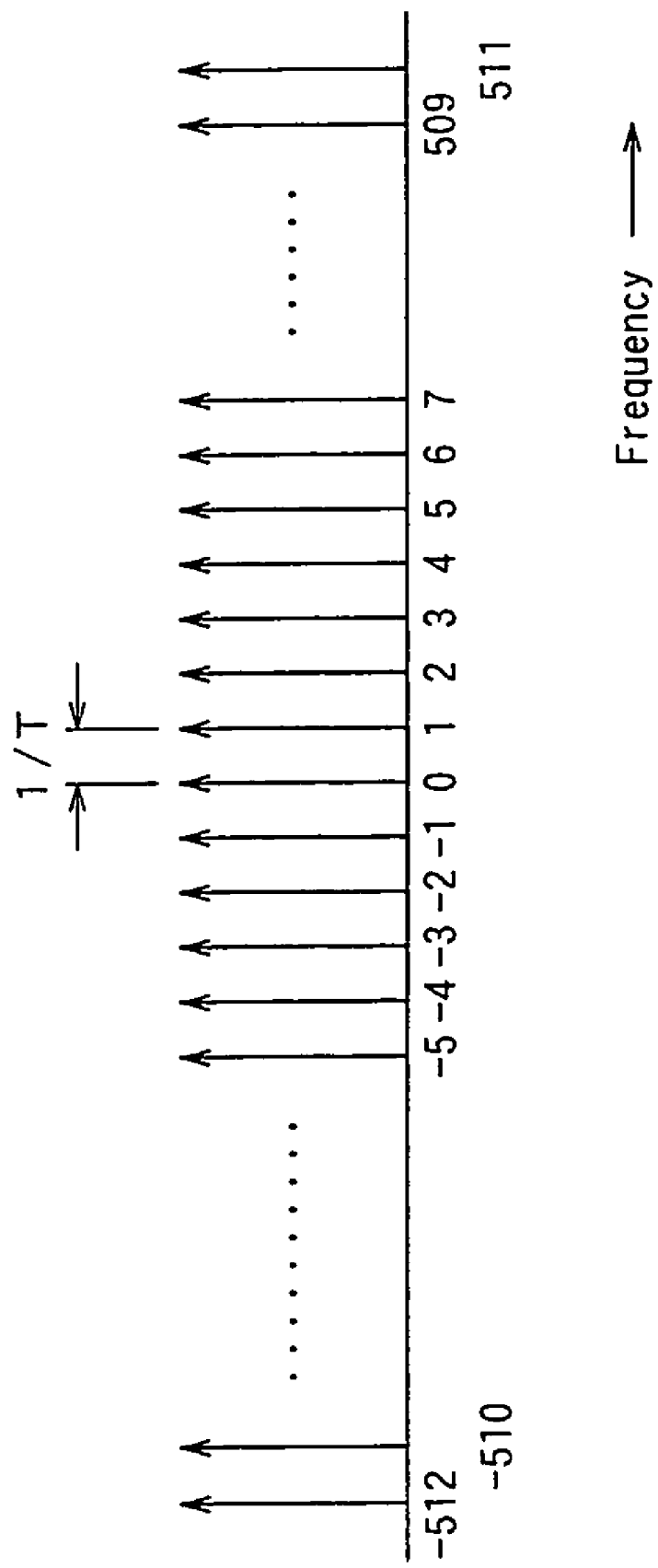
FIG. 17 shows sub-carrier numbers.

FIG. 17 shows the arrangement of the sub-carriers of each frequency of the OFDM signal, and sub-carrier number, by way of example.

As shown in FIG. 17, the sub-carrier number n takes the number for a sub-carrier positioned at the center frequency of the OFDM signal as zero (0) in this embodiment. Sub-carriers are positioned at intervals of a frequency $\Delta f$ ($\Delta f=1/T$:T is an effective symbol length) and a number is assigned to each of the sub-carriers. Sub-carriers positioned at lower frequencies than the center frequency are assigned numbers −1 to −512, respectively, while sub-carriers positioned at higher frequencies than the center frequency are assigned numbers 1 to 511, respectively. The sub-carrier number n has a value corresponding to the frequency of the sub-carrier as shown in FIG. 17.

Also, the correction amount is different from one sub-carrier for the reason that since the phase-correction amount $\beta_m$ is represented by a delay between the FFT-extraction timing and symbol-boundary timing, so a phase rotation taking place for the delay time is different from one frequency to another.

As above, the phase-correction amount calculation circuit 44c determines a phase-correction amount $\theta_{clk}(n)$ and supplies it to the complex conversion circuit 44d.

The complex conversion circuit 44d converts the supplied phase-correction amount $\theta_{clk}(n)$ into a complex signal by calculating a sine and cosine of the phase-correction amount $\theta_{clk}(n)$. The complex conversion circuit 44d supplies the complex-converted phase-correction amounts (cos ($\theta_{clk}(n)$) and sin ($\theta_{clk}(n)$)) as phase-correction signals to the phase correction circuit 11.

Supplied with the phase-correction signals, the phase correction circuit 11 makes complex multiplication of data corresponding to each sub-carrier in the OFDM frequency-domain signal from the FFT calculation circuit 10 by the phase-correction signals (cos ($\theta_{clk}(n)$) and sin ($\theta_{clk}(n)$) from the complex conversion circuit 44d. More specifically, the phase correction circuit 11 makes a matrix calculation as follows:

$$\begin{pmatrix} I_{out}(n) \\ Q_{out}(n) \end{pmatrix} = \begin{pmatrix} \cos\theta_{clk}(n) & -\sin\theta_{clk}(n) \\ \sin\theta_{clk}(n) & \cos\theta_{clk}(n) \end{pmatrix} \begin{pmatrix} I_{in}(n) \\ Q_{in}(n) \end{pmatrix}$$

where $I_{in}(n)$ and $Q_{in}(n)$ indicate results of calculation of the sub-carrier number n from the FFT calculation circuit 10, $I_{in}(n)$ indicates a real part and $Q_{in}(n)$ indicates an imaginary part, and $I_{out}(n)$ and $Q_{out}(n)$ indicate results of phase correction of the sub-carrier number n from the phase correction circuit 11. The $I_{out}(n)$ indicates a real-number component, and $Q_{out}(n)$ indicates an imaginary-number component.

Thus, the symbol-boundary correction circuit 44 has a very simple circuit construction and can correct an error accurately. Further, since the symbol-boundary correction circuit 44 calculates an error amount using a guard correlation/peak signal not yet FFT-calculated, so the synchronization can be pulled in very fast than in case the correction is made by feeding back a pilot signal or the like, for example.

Start-flag Generation Circuit

The start-flag generation circuit 45 is supplied with symbol start information (integrally-rounded symbol-boundary position Nx) supplied at every M symbols from the symbol-boundary correction circuit 44, and generates a start flag indicative of a signal extraction timing for the FFT calculation (that is, an FFT-calculation start timing). A start flag is generated at each OFDM symbol.

As shown in FIG. 16, the start-flag generation circuit 45 includes a counter 45a, register 45b, and a comparator 45c.

The counter 45a is a same synchronization counter which operates synchronously with the free-running counter 37 in the guard correlation/peak detection circuit 12. Namely, the counter 45a counts values 0 to Ns. Further, the counter 45a takes a phase delayed by a delay time in the aforementioned symbol-boundary calculation circuit 43 from the count in the free-running counter 37.

The register 45b stores the symbol start information (integrally-rounded symbol-boundary position Nx) from the symbol-boundary correction circuit 44 each time a validity flag is asserted (timing "1").

The comparator 45c make a comparison between the count from the counter 45a and the symbol start information stored in the register 45b to generate a start flag that becomes High (1) in a timing of the coincidence between the count and symbol start information.

The start flag generated by the comparator 45c is supplied to the FFT calculation circuit 10. The FFT calculation circuit 10 parallelizes a supplied serial data series in a timing in which the start flag has become High (1) to extract Nu pieces of data for the FFT calculation.

As above, the start-flag generation circuit 45 converts a timing indicated by the symbol-boundary position Nx calculated by the symbol-boundary calculation circuit 43 into a start flag synchronous with the serial data series supplied to the FFT calculation circuit 10, and supplies it to the FFT calculation circuit 10.

Note that although the counter 45a is provided in the start-flag generation circuit 45 according this embodiment, the count by the free-running counter 37 may be adjusted by delaying and supplied to the comparator 45c.

Also, the delay of the counter 45a in relation to the count by the free-running counter 37 may be a value resulted from adding a margin to a processing delay of the symbol-boundary calculation circuit 43 to adjust the extraction range for the FFT calculation so that an inter-symbol interference due to a preceding ghost will be canceled.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

The invention claimed is:

1. A demodulator for demodulating an orthogonal frequency division multiplex (OFDM) signal whose unit of transmission is a transmission symbol including effective symbols generated by performing time division of an information series and having modulating the information into a plurality of sub-carriers and a guard interval generated by copying a signal waveform of a part of the effective symbols, the demodulator comprising:

a reference time generating circuit for generating a reference time based on a reference clock signal;

a Fourier transform circuit for extracting a complex signal modulated in each sub-carrier of the transmission symbol by extracting signal areas corresponding to the number of the plurality of sub-carriers for the effective symbols of the OFDM signal sampled with the reference clock signal and performing a Fourier transform of the extracted signal areas;

a guard correlation peak time detecting circuit for detecting a timing in which an autocorrelation of the guard interval portion of the OFDM signal attains a peak and for generating a peak time synchronous with the reference time;

a symbol-boundary time estimating circuit for estimating, based on the peak time, a symbol-boundary time that is a boundary time of the transmission symbol synchronous with the reference time;

a timing control circuit for controlling a timing position where the complex signal is extracted by the Fourier transform circuit based on the symbol-boundary time representing a precision of the reference clock signal cycle; and a phase correcting circuit for calculating a phase-correction amount based on the symbol-boundary time representing a precision smaller than the reference clock signal cycle and making, based on the calculated phase-correction amount, phase correction of the complex signal having been modulated in each of the plurality of sub-carriers and extracted by the Fourier transform circuit.

2. The apparatus according to claim 1, wherein:

the timing control circuit rounds the symbol-boundary time to the precision of the reference clock signal and controls an extraction timing position of a signal area by the Fourier transform circuit based on the rounded symbol-boundary time; and the phase correcting circuit calculates a difference between a symbol-boundary time estimated by the symbol-boundary time estimating circuit and the symbol-boundary time rounded by the timing control circuit and calculates the phase correction amount based on the basis of the calculated time difference.

3. The apparatus according to claim 1, wherein the phase correcting circuit calculates the phase correction amount for each sub-carrier of the plurality of sub-carriers corresponding to a symbol-boundary time represented by a precision smaller than an operation clock cycle and the frequency of each sub-carrier in which a complex signal for the phase correction is modulated.

* * * * *